(12) United States Patent
Salvino

(10) Patent No.: US 12,091,973 B1
(45) Date of Patent: *Sep. 17, 2024

(54) GAS MINING COVER ARRANGEMENT

(71) Applicant: Chris Salvino, Scottsdale, AZ (US)

(72) Inventor: Chris Salvino, Scottsdale, AZ (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,275

(22) Filed: Oct. 5, 2023

Related U.S. Application Data

(63) Continuation-in-part of application No. 18/368,477, filed on Sep. 14, 2023, now Pat. No. 12,044,126, which is a continuation-in-part of application No. 18/230,125, filed on Aug. 3, 2023.

(51) Int. Cl.
*E21C 51/00* (2006.01)

(52) U.S. Cl.
CPC ..................................... *E21C 51/00* (2013.01)

(58) Field of Classification Search
CPC .................................. E21C 51/00; B64G 1/16
See application file for complete search history.

(56) References Cited

U.S. PATENT DOCUMENTS

| | | | |
|---|---|---|---|
| 5,426,949 A * | 6/1995 | Saho ........................ | F25B 9/00 62/51.1 |
| 9,134,047 B2 | 9/2015 | Black et al. | |
| 9,581,021 B2 * | 2/2017 | Ethridge ................ | H05B 6/702 |
| 10,222,121 B2 | 3/2019 | Cullinane et al. | |
| 10,481,048 B2 * | 11/2019 | Giles ...................... | A01B 79/00 |
| 11,143,026 B2 * | 10/2021 | Sercel ..................... | E21B 36/04 |
| 11,566,521 B2 * | 1/2023 | Sercel ..................... | H05B 6/72 |
| 11,624,542 B2 | 4/2023 | Sung | |
| 11,719,100 B2 * | 8/2023 | Metzger .................. | B64G 5/00 209/39 |
| 11,852,016 B2 * | 12/2023 | Kuhns ..................... | F02K 99/00 |
| 2008/0003133 A1 * | 1/2008 | Taylor .................... | B64G 99/00 422/21 |
| 2011/0168164 A1 * | 7/2011 | Zillmer ................... | B64G 1/16 126/685 |

(Continued)

OTHER PUBLICATIONS

Rice, Development of Lunar Ice/Hydrogen Recovery System Architecture, Jan. 1, 2000, p. 36, NIAC, Madison, WI.

*Primary Examiner* — Jonathan Miller
(74) *Attorney, Agent, or Firm* — Kenneth Altshuler

(57) ABSTRACT

A vapor collection system that can be used at an extraterrestrial body is envisioned to collect target gaseous atoms and molecules (material) floating around in a shielded environment at a pressure at or less than a bar. The shielded environment is defined within a cover and skirt arrangement that rests atop granular soil, which in one embodiment is regolith. The cover and skirt arrangement generally comprises a skirt that extends from the cover to essentially seal against the surface of regolith to create a shielded environment to contain gaseous material from escaping into space. The skirt can be lowered on the regolith surface or dragged across and even made to conform to the surface. The gaseous material can be mined via a blade or excavation tool and heat source that liberates the gaseous material from the regolith.

20 Claims, 36 Drawing Sheets

(56) References Cited

U.S. PATENT DOCUMENTS

| | | | |
|---|---|---|---|
| 2012/0155966 A1* | 6/2012 | Zillmer | B64G 4/00 |
| | | | 405/128.85 |
| 2016/0024921 A1* | 1/2016 | Ethridge | H05B 6/72 |
| | | | 219/385 |
| 2019/0271228 A1* | 9/2019 | Sowers, Jr. | E21C 51/00 |
| 2020/0240267 A1* | 7/2020 | Sercel | B64G 99/00 |
| 2021/0116889 A1* | 4/2021 | Keravala | B25J 5/00 |
| 2021/0404338 A1* | 12/2021 | Metzger | B64G 5/00 |
| 2024/0035379 A1 | 2/2024 | Grillos | |

\* cited by examiner

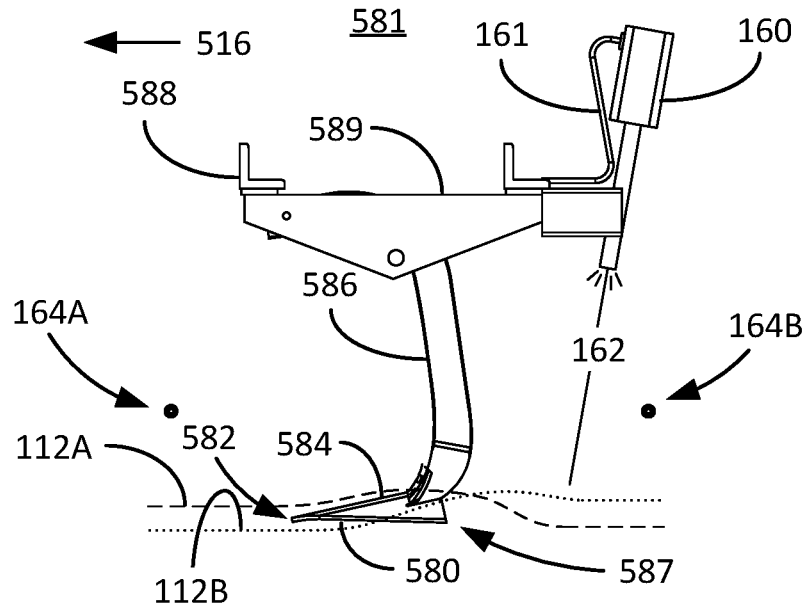
FIG. 12A
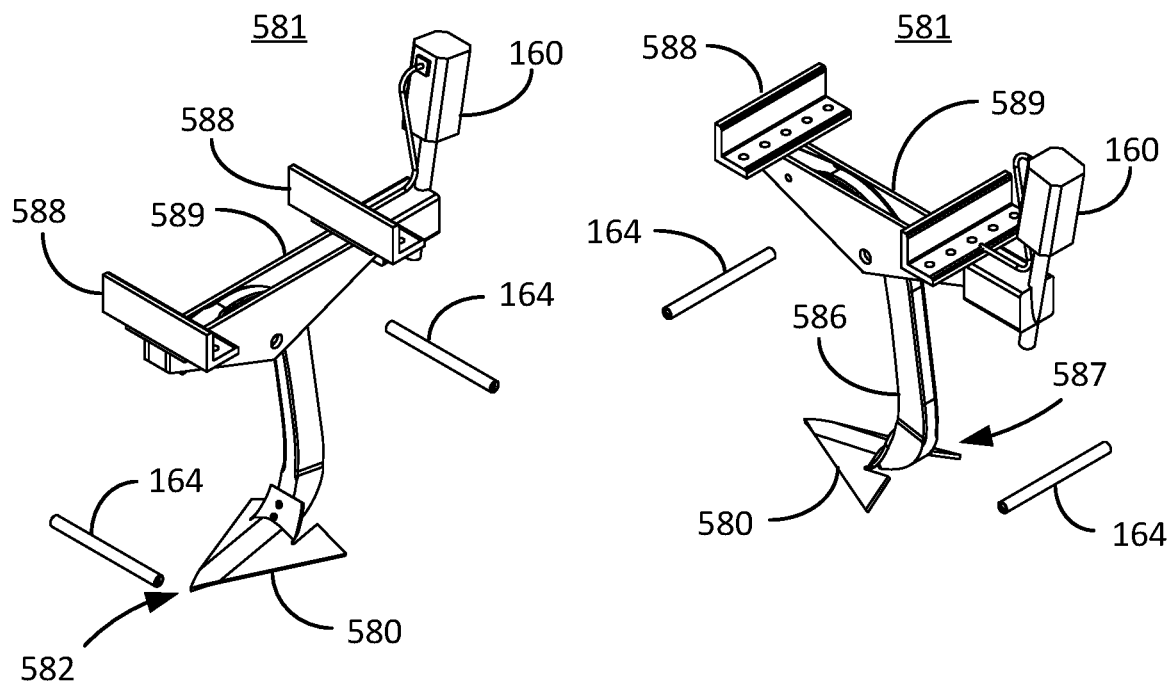
FIG. 12B  FIG. 12C

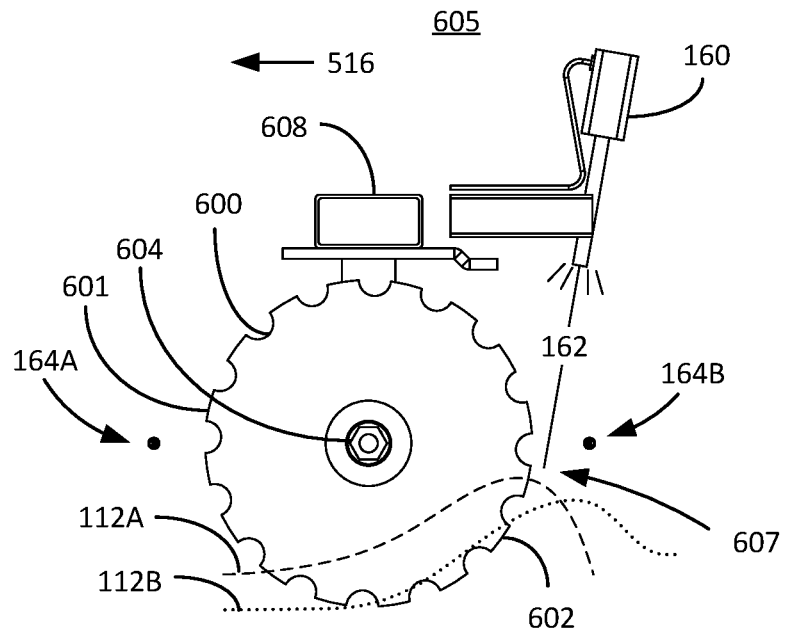
FIG. 14A
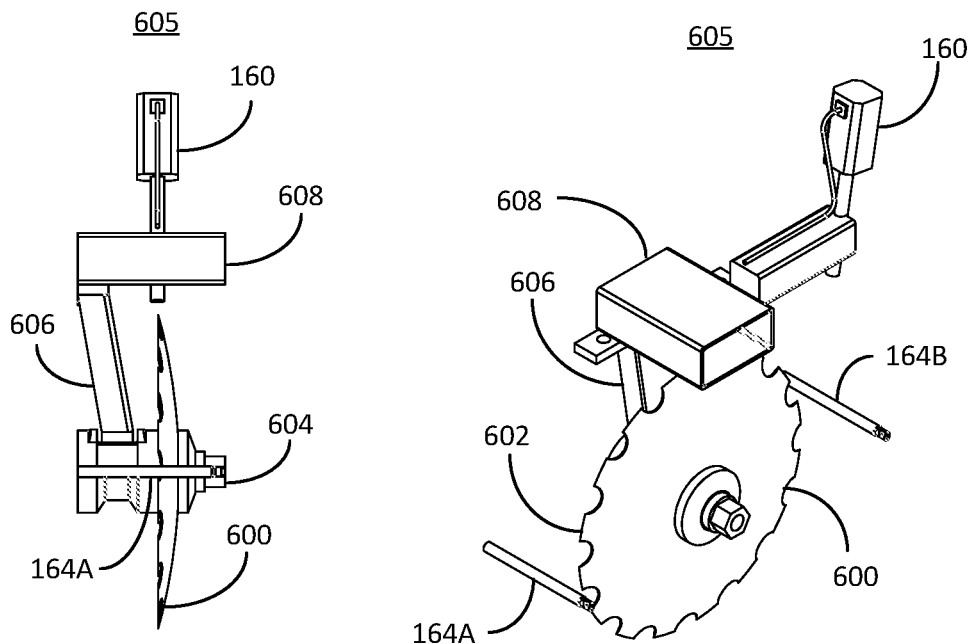
FIG. 14B
FIG. 14C

GAS MINING COVER ARRANGEMENT

CROSS-REFERENCE TO RELATED APPLICATIONS

This continuation-in-part application which claims priority to and the benefit of U.S. patent application Ser. No. 18/368,477 entitled: SOIL DISRUPTING SYSTEM, filed on Sep. 14, 2023, the entire disclosure of which is hereby incorporated herein, which is a continuation-in-part application claiming priority to and the benefit of U.S. patent application Ser. No. 18/230,125 entitled: GAS COLLECTION SYSTEM, filed on Aug. 3, 2023, the entire disclosure of which is hereby incorporated herein.

BACKGROUND OF THE INVENTION

1. Field of the Invention

The present invention relates generally to disrupting and clearing regolith for mining gaseous material in a very low-pressure environment (below $1\times10^{-5}$ bar).

2. Description of Related Art

Helium-3 (He-3) holds immense potential as a clean and efficient energy source, offering numerous benefits for various applications. It has been discovered that He-3 is a highly efficient fuel for nuclear fusion, which has the potential to provide a nearly limitless and environmentally friendly energy solution. When He-3 fuses with deuterium, it produces a helium atom, a proton, and a tremendous amount of energy. Unlike traditional nuclear fission, fusion reactions release energy without generating hazardous radioactive waste or greenhouse gas emissions. Harnessing He-3 for fusion could revolutionize the energy landscape, providing a stable and sustainable source of power for the future.

However, despite its remarkable benefits, mining He-3 on Earth faces significant limitations. For one thing, He-3 is incredibly scarce on our planet. It is primarily found in minute quantities in the top surfaces of lunar soil, known as regolith, and is sparsely present in the Earth's atmosphere. Consequently, the extraction of He-3, whether on Earth or the Moon, is challenging and expensive. Moreover, mining it on the Moon poses logistical difficulties requiring advanced technologies and significant investments. Even assuming mining on the Moon is successful, transporting the mined He-3 from the Moon to Earth presents significant technical challenges and high costs. These limitations highlight the need for further research and development to find more accessible and cost-effective sources of He-3 or to explore alternative fusion fuel options that do not rely solely on He-3.

The subject matter disclosed herein is generally directed to innovations related to collecting He-3 and other useable gaseous elements on extra-terrestrial bodies.

SUMMARY OF THE INVENTION

The present invention generally relates to an apparatus for mining and collecting He-3 as well as other target gaseous elements from extra-terrestrial bodies in a very low-pressure environment. A very low pressure is defined as below $1\times10^{-5}$ bar.

One embodiment of the present invention contemplates a mining arrangement comprising a cover that has a rigid cover body extending in a first direction from a cover rim to a cover top/apex and a skirt extending in a second direction from the cover rim to a skirt rim, wherein the second direction is opposite the first direction. The cover and the skirt define a shielded environment when the skirt rim rests atop granular soil (on the surface of), such as regolith. The shielded environment is essentially not in communication with an outside environment via the cover body and skirt. A heat source is disposed in the shielded environment, wherein the heat source configured to heat the granular soil. A gas collection surface is disposed in the shielded environment, wherein the gas collection surface is configured to maintain a temperature below 100° Kelvin.

Another embodiment of the present invention contemplates a variation of an environmental shield arrangement comprising a cover with a skirt, wherein the cover terminates at a cover rim. The cover rim defines a cover rim periphery. The skirt extends from the cover rim along the cover rim periphery to a skirt rim. The cover and the skirt define a shielded environment when the skirt rim is on (atop) regolith. The shielded environment is essentially not in communication with an outside environment via the cover and skirt. While in use, the shielded environment is never at a pressure above 10 millibars since regolith is extra-terrestrial and inherently is under a low pressure below 10 millibars.

In yet an optional embodiment of the present invention, an environmental shield arrangement is contemplated comprising a cover that when disposed on a regolith surface defines an interior environment containing helium. The cover is defined, in part, by a cover body that extends from a cover apex to a cover rim, wherein the cover rim defines a cover rim periphery. A skirt extends from the cover rim along the periphery to a skirt rim. The interior environment is defined within the cover and the skirt when the skirt rim is disposed on regolith. The shielded environment is maintained at a pressure of below 10 millibars and contains helium gas. This embodiment is further envisioned wherein the cover rim periphery is essentially rectangular.

Still yet another embodiment of the present invention envisions a mining arrangement comprising: a shielded environment defined within a cover that rests atop granular soil, which in one embodiment is regolith. The cover comprises a cover body that extends from a rim to a cover top. The shielded environment is not in communication with an outside environment via the cover body. The mining arrangement further comprises a blade a heat source and a gas collection surface. The blade extends from the rim and is configured to penetrate the granular soil. The heat source, which is disposed in the cover is configured to heat the granular soil. The gas collection surface is disposed in the shielded environment and is configured to maintain a temperature below 100° Kelvin to condense target gasses (liberated from the regolith) on the gas collection surface.

Another embodiment of the present invention envisions a mining configuration that comprises internal (shielded) environment configured to be maintained at a pressure of less than $1\times10^{-5}$ bar. The internal environment is defined within a cover that rests atop granular soil, wherein the internal environment is confined within the borders of the granular soil and interior surface of the cover. The cover comprises a cover body that extends from a rim to a top cover apex. The internal environment is not in communication with an outside environment via the cover body. The mining arrangement further comprises a blade, a heat source and a gas collector. The blade extends from the rim, wherein the blade is partially in the granular soil. The heat source is disposed in the cover, wherein the heat source is configured to heat the granular soil. The gas collector is in the shielded environment and is configured to collect gas that is freed from the granular soil via heat from the heat source.

Yet another embodiment of the present invention envisions a mining system method that comprises providing a shielded environment that is defined within a cover. The cover comprising a cover body that extends from a rim to a cover top. This is stipulated that the shielded environment is not in communication with an outside environment via the cover body. The method further envisions a step for resting the cover atop regolith, penetrating the regolith with a blade extending from the rim, heating the regolith with a heat source that is disposed in the cover, and maintaining a gas collection surface at a temperature below 100° Kelvin. The gas collection surface is in the shielded environment.

BRIEF DESCRIPTION OF THE DRAWINGS

FIG. 12A-12C are line drawings of various views of a single spike cultivator blade arrangement consistent with embodiments of the present invention;

FIGS. 14A-14C are line drawings of a single disk harrow embodiment consistent with embodiments of the present invention;

DETAILED DESCRIPTION

Figure 1A:
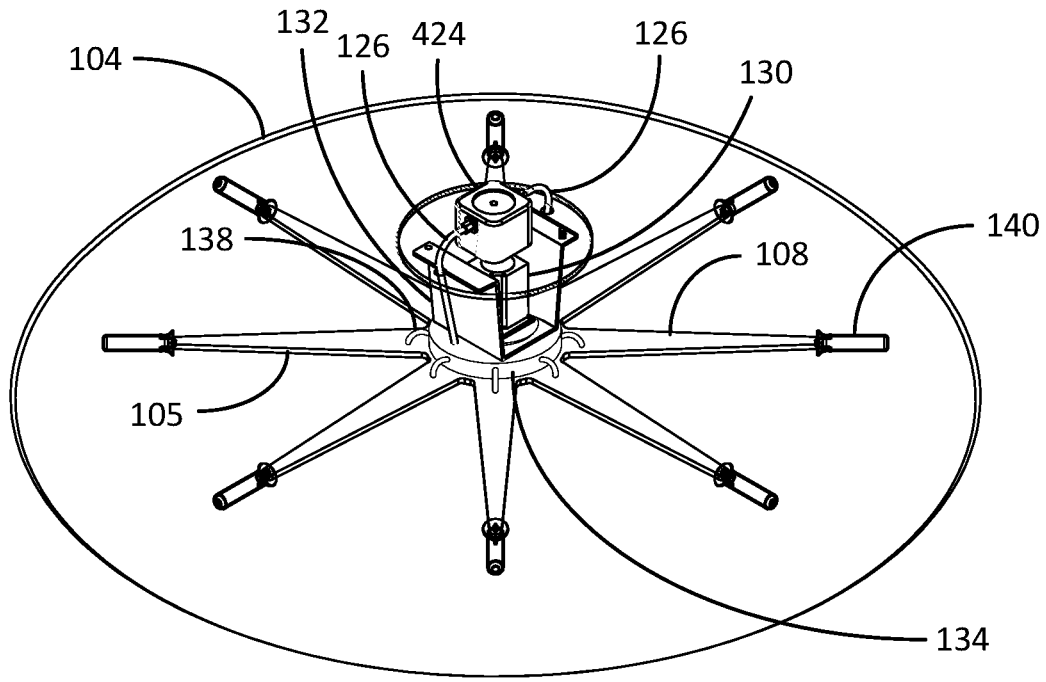
FIGS. 1A-1C are line drawings of a vapor collection system embodiment constructed in accordance with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/− value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to collecting vaporize gaseous atoms and molecules in an extremely low-pressure environment. Extremely low-pressure environment is defined herein as below $1\times10^{-5}$ bars, wherein pressure at sea-level on Earth is approximately 1 bar. Aspects of the present invention consider mining gaseous atoms and molecules on extraterrestrial bodies such as the Moon, asteroids, moons orbiting other planets, etc., for example. Many of these extraterrestrial bodies have little to no ambient pressure at or just beyond their surfaces and depending on the size of the extraterrestrial body have a significantly lower gravitational pull than that experienced on Earth.

Though embodiments of the present invention can be used in conjunction with many different extraterrestrial bodies, it is one object of the present invention to focus on mining gaseous atoms and molecules (materials) from the Moon. The Moon's atmosphere (the surface boundary exosphere) has a pressure of about $3\times10^{-15}$ bars and can range in temperature between 20° to 400° Kelvin. In the interest of continued exploration of the Moon as well as maintaining long-term residents on the Moon, extracting or otherwise mining important gaseous materials from the Moon, such as oxygen, nitrogen, hydrogen, and helium, for example, reduces the dependency of transporting such gaseous materials from the Earth. Moreover, helium-3, a light stable isotope of helium having two protons and one neutron, which has promise as an important constituent in fusion reactions, is far more abundant on the Moon than the Earth. In some estimates, helium-3 is more than a thousand times more abundant on the Moon than compared to the Earth making the Moon a better target to obtain helium-3.

Certain embodiments of the present invention envision extracting target gaseous materials from the Moon by heating up moon regolith (lunar soil/minerals) to gas vaporizing temperatures defined as temperatures that are high enough to liberate/vaporize these target gaseous materials from moon regolith, or simply "regolith". The vaporized target gaseous materials are then collected as liquid from condensation surfaces that are at or below the condensation temperatures corresponding to each of the target gaseous materials. When condensed i.e., liquefied, the liquid is collected and retained in containers, which improves the transportation of these target materials.

Accordingly, some embodiments of the present invention contemplate a zero tailings mining arrangement equipped with a vapor collection system that can be used at an extra-terrestrial body to collect target gaseous atoms and molecules that are floating around in a shielded environment at a pressure at or less than $1\times10^{-5}$ bar, which is pressure consistent on the Moon. Other embodiments contemplate operating at a pressure consistent with Mars, which is less than $1\times10^{-2}$ bar. Tailings are the waste material that has already been mined. The shielded environment is defined within sidewalls and in some cases is defined within a cover. A condensation surface in the shielded environment is maintained at a temperature between 2° Kelvin and 100° Kelvin, and optionally under 100° Kelvin to collect the target gas that is floating around, which condenses on the condensation surface as a liquid. A collection receptacle at the condensation surface collects the liquid. A heating element in the shielded environment is made to heat and release the target gas from minerals at or beyond the rim. The gas floats around in the shielded environment. The shielded environment can include a cover and skirt with the goal of conforming to the surface of the regolith to better form a closed interior environment within the cover and skirt. The skirt may be retracted and extended to the surface of the regolith or optionally may be compliant to conform to topographies on the regolith surface.

Figure 1B:
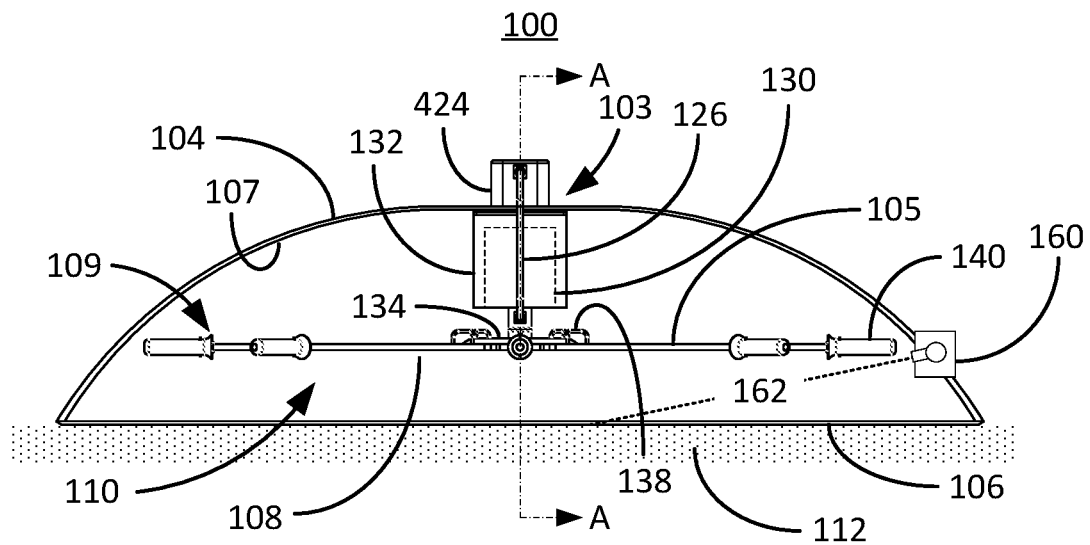
Figure 1C:
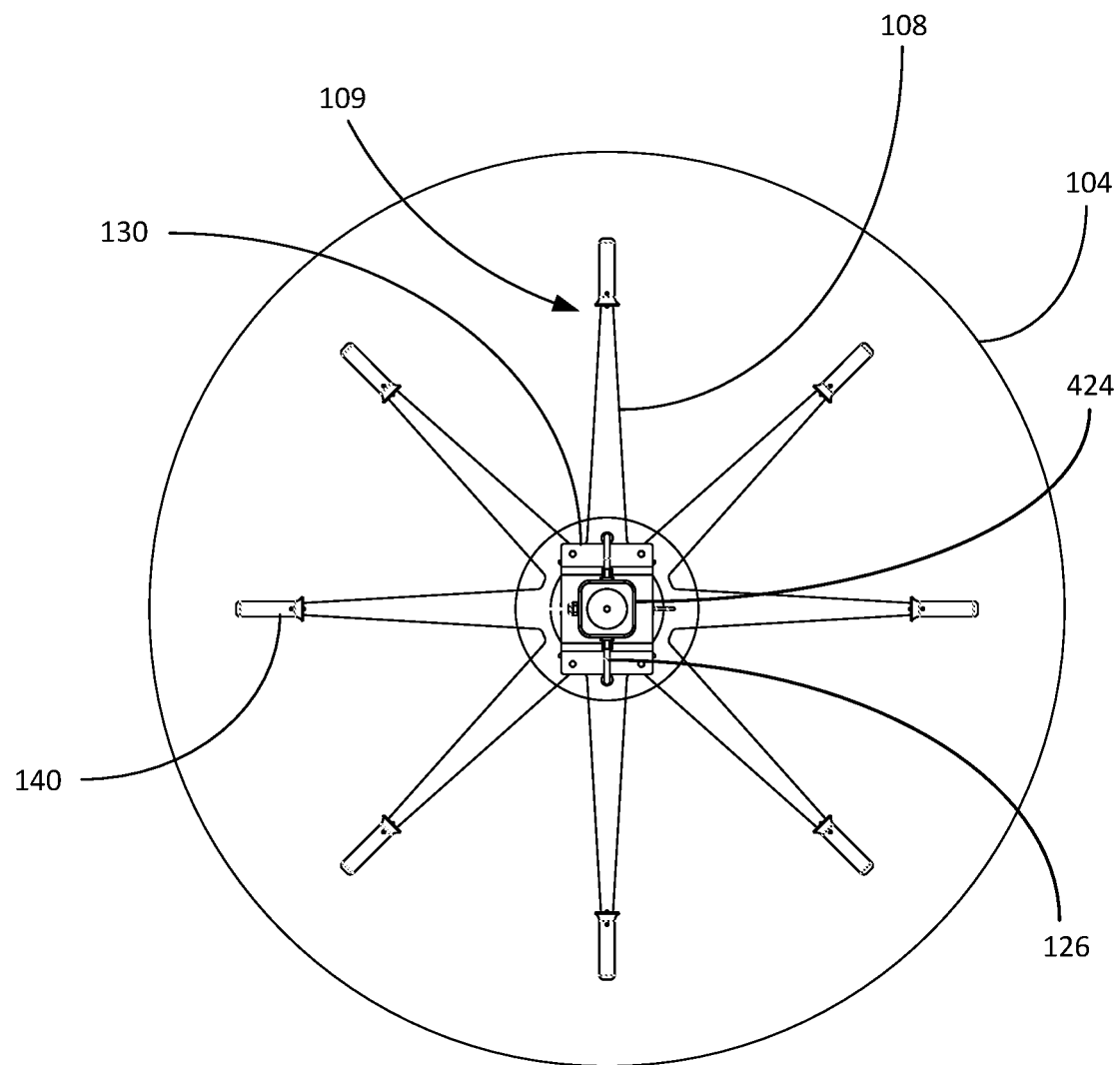

Referring to the drawings, FIGS. 1A-1C are line drawings of a vapor collection system embodiment constructed in accordance with embodiments of the present invention. FIG. 1A is a simplified isometric view of a vapor collection system embodiment 100, wherein the dome cover 104 is depicted as transparent to view the elements therein. In this embodiment, a cryogenic pump 424 extends from the dome apex 103 (shown in FIG. 1B), which is in communication with a cryogenic tank 134 via cryogenic transfer lines 126. The pump 424 pumps cryogenic fluid from the cryogenic tank 134 to chill the plurality of blades 108, which receive the cryogenic fluid via cryogenic feed lines 138. The blades 108 are the condensation surfaces 105 configured to collect vaporized target material 115 of FIG. 3A (atoms and molecules) in the form of liquid condensation. The plurality of blades 108 are configured to spin via a motor 130 inside of a domed cover 104. Certain embodiments envision the blades 108 spinning between 5-60 rpm, though other speeds may be considered outside of this range depending on the desired accumulation of gaseous material 115. The motor 130 is mounted inside of a motor shield 132, which provides support for the motor 130 from the domed cover 104. The spinning blades 108 serve several purposes including A) providing a higher probability of colliding with the vaporized target atom or molecule 115 that when they hit the chilled blades 108, the gaseous material 115 will condense and liquefy on the chilled condensation surface 105 and B) migrating the liquified target material by way of centripetal force to the distal ends 109 of each of the blades 108. In this embodiment, the liquefied target material migrates (via the centripetal force from the spinning blades 108) into collection tubes 140 that are located at each of the blade distal ends 109. Certain embodiments envision the blades 108 being made of copper or silver and in some cases coated with gold for their superior heat transfer capacity. The chilled condensation blades 108 are chilled to temperatures at the condensation point of the target gaseous material 115 which causes the target gaseous material 115 to collect or otherwise stick and coalesce on the blades 108.

As shown in FIG. 1B, the blades 108 are located inside the internal volume 110 of a domed cover 104. The domed cover 104 extends from a dome apex 103 to a dome rim 106. The dome rim 106 is configured to rest atop regolith 112. The internal volume 110 of the cover 104 is defined as the volume of space bounded between the internal cover surface 107 and the regolith 112 (shown here as the speckled dust). A heating source 160 inside of the cover 104 is configured to heat the regolith 112 at a temperature that vaporizes the target materials from the regolith 112 thereby expelling the vaporized target materials into the internal volume 110. In this embodiment, the heating source 160 is a laser on a gimble that sweeps a laser beam 162 over the surface of the regolith 112 to direct the laser beam 162 to heat a target region 116 on the surface of the regolith 112. In other words, the laser beam 162 provides localized or point heat that heats a small area 112 of the surface of the regolith 112 where the laser beam 162 hits the regolith 112 as the laser beam 162 sweeps over the surface of the regolith 112. Optional heating source embodiments include radiative elements that heat the surface of the regolith 112, heated teeth that penetrate the regolith 112, such as a heated rake or heated spikes, just to name several examples. The regolith 112 is envisioned to be heated at a temperature above 500° Kelvin, with some temperature ranges between 500°-1500° Kelvin. For example, He-3 is liberated from regolith from between about 875°-1100° Kelvin. In some instances, gas can be liberated from the heated regolith 112 in conjunction with a combination of chemicals.

FIG. 1C is a top-down view of the vapor collection system 100 looking through the domed cover 104. As shown, the eight condensation blades 108 are driven by the motor 130 that spins about the central axis 112, which when spinning causes condensed material (condensate) to migrate to the distal ends 109 of the blades 108, and subsequently to the collection tubes 140, by way of centripetal force. The pump 424 circulates the cryogenic fluid through the blades 108 while they spin by way of hydraulic slip rings (not shown), which makes feeding cryogenic fluid to the blades 108 while continuously rotating a possibility, as known to those skilled in the art.

Figure 1D:
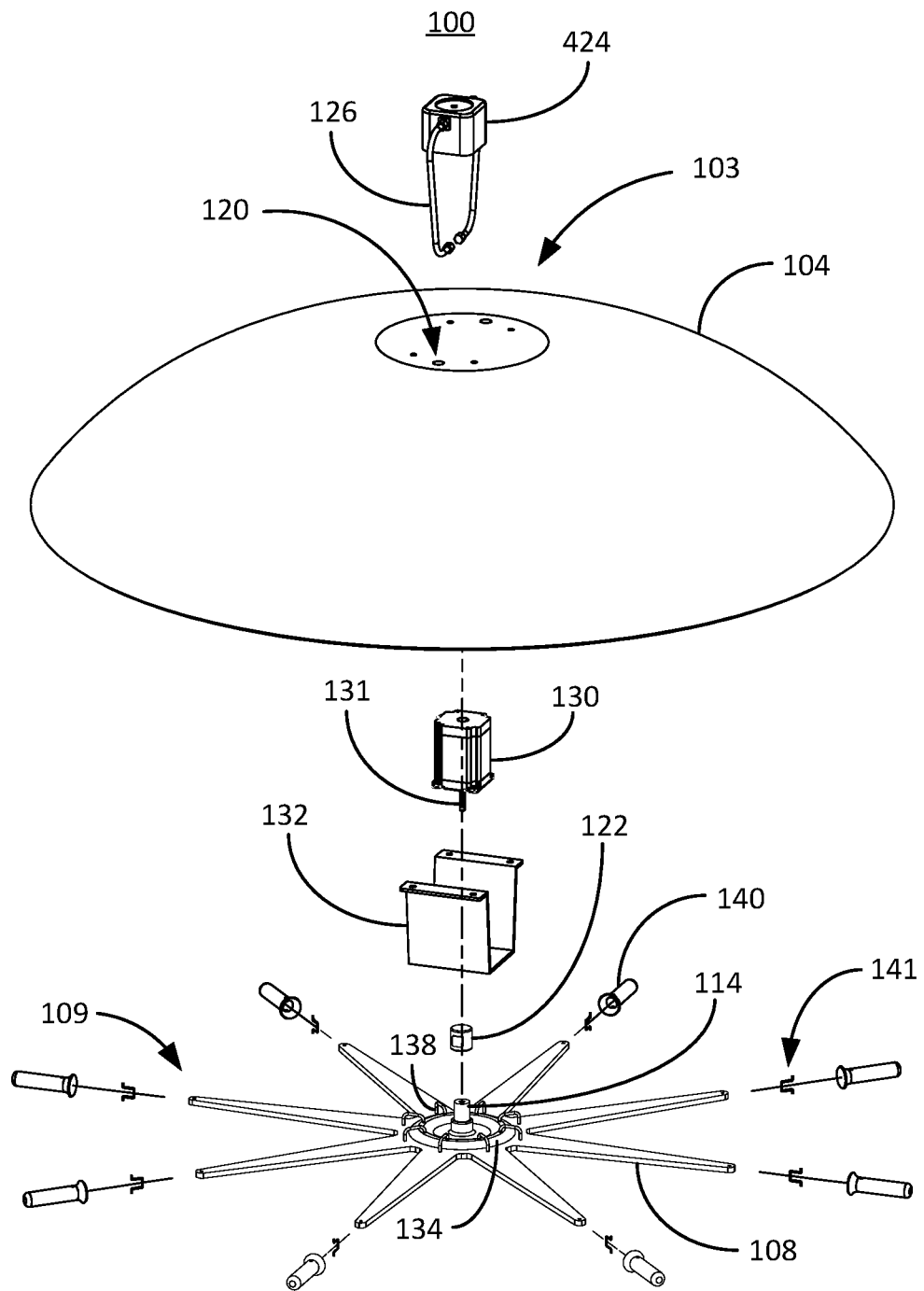
FIG. 1D is a line drawing of an exploded view of the vapor collection system of FIG. 1A.

FIG. 1D is a line drawing of an exploded view of the vapor collection system 100 of FIG. 1A. As shown, the cryogenic pump 424 comprises cryogenic transfer lines 126 that extend through accommodating holes/ports 120 at the apex 103 of the cover 104. Below the dome cover 104 is the blade spinning motor 130 that spins the condensation blades 108. The blade spinning motor 130 is supported by a motor shield 132 that is mounted to the inner surface of the dome apex 103. The motor shaft 131 extends into a blade central axis shaft 114 in the center of the eight blades 108, as shown, which when turned on spins the eight blades 108. A controller can be connected to the blade spinning motor 130 to control the motor's speed. A slip ring arrangement 122 (also known as a rotary joint) is attached to the cryogenic transfer lines 126 to transmit cryogenic fluid through the cryogenic reservoir 134 to the blades 108 via the cryogenic feedlines 138 while the blades 108 are spinning. The slip ring arrangement 122 is a self-contained assembly that prevents leakage or damage to the stationary and rotary parts so that cryogenic fluid can circulate continuously through the rotating blades 108. Each of the collection tubes 140 is attached to a corresponding blade distal end 109 via a mechanical clip 141.

Figure 1E:
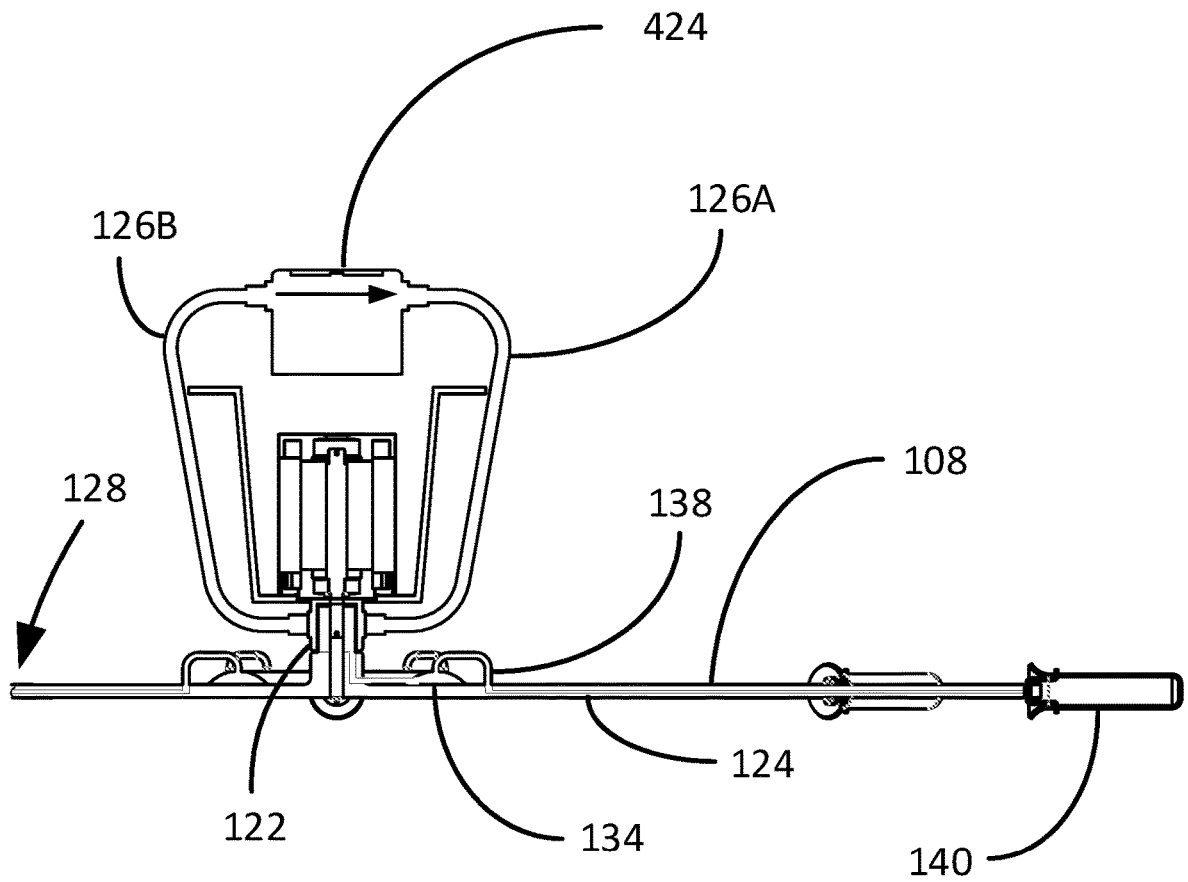
FIG. 1E is a line drawing of a cross-section view along cut-line A-A from FIG. 1B with the left-hand side of the blades cut away to improve resolution of the system consistent with embodiments of the present invention.

FIG. 1E is a line drawing of a cross-section view along cut-line A-A from FIG. 1B with the left-hand side of the blades 108 cut away to improve resolution of the components of interests in this figure. As shown, the cryogen pump 424 is configured to pump cryogenic fluid (see arrow below the top of the cryogen pump 424) down a cryogenic transfer feed line 126A to the cryogen tank 134 via the slip ring arrangement 122. The circulating cryogenic fluid is moved through the cryogen feedlines 138 and into the blades 108 by way of the blade cryogen heat exchange tubes 124, which in some embodiments are described more detail in conjunction with FIGS. 7A and 7B. The cryogenic fluid is configured to chill the blades 108 down to a temperature that is below the condensation point of the target gaseous material 115 that is floating around the internal volume 110 inside of the cover 104. Cryogenic fluid is then returned to the pump 424 by way of cryogenic transfer return line 126B where the cryogenic fluid is circulated. Not shown here but depicted in FIG. 7A and described in the associated text is a heat exchange embodiment that includes a compressor and heat exchanger 430, which pulls the heat away from the cryogenic fluid upon returning to the pump 424.

Figure 2A:
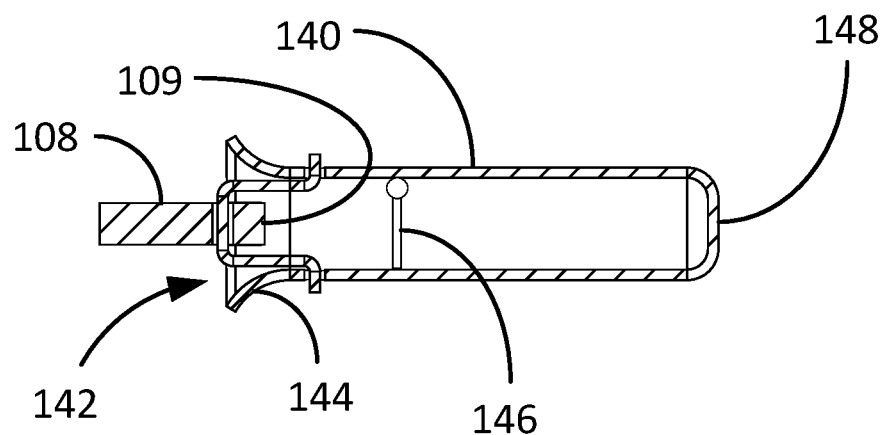
FIGS. 2A and 2B are line drawings of a collection tube embodiment consistent with embodiments of the present invention.
Figure 2B:
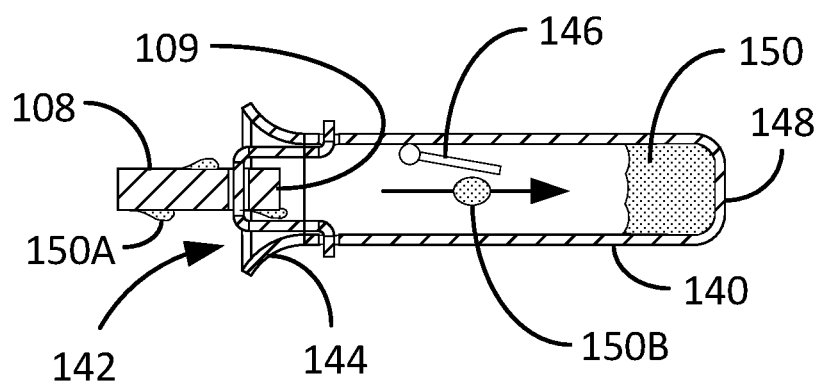

FIG. 2A is a line drawing of a collection tube embodiment consistent with embodiments of the present invention. As shown, the collection tube embodiment 140 is essentially a closed tube with an inlet port (open end) 142 interfacing the blade distal end 109. The collection tube 140 comprises a tube flare 144 that has an outwardly flared lip to provide a larger inlet port 142 for enhanced fluid collection 150 from the blade 108. In operation, as shown in FIG. 2B, as the condensation blade 108 spins, the condensation liquid 150 that is on a condensation blade 108 migrates to the blade distal end 109 where the condensed droplets 150B are thrown off to collect in a pool of condensed target material 150 at the tube distal end 148. The spring valve 146 opens due to the centripetal force of the combination spinning blade 108 and tube 140 permitting the droplets 150B to pass to the tube distal end 148, see the arrow in conjunction with the droplet 150B. When the blades 108 are not spinning the spring valve 146 closes thereby trapping the liquid 150 inside of the tubes 140.

Figure 3A:
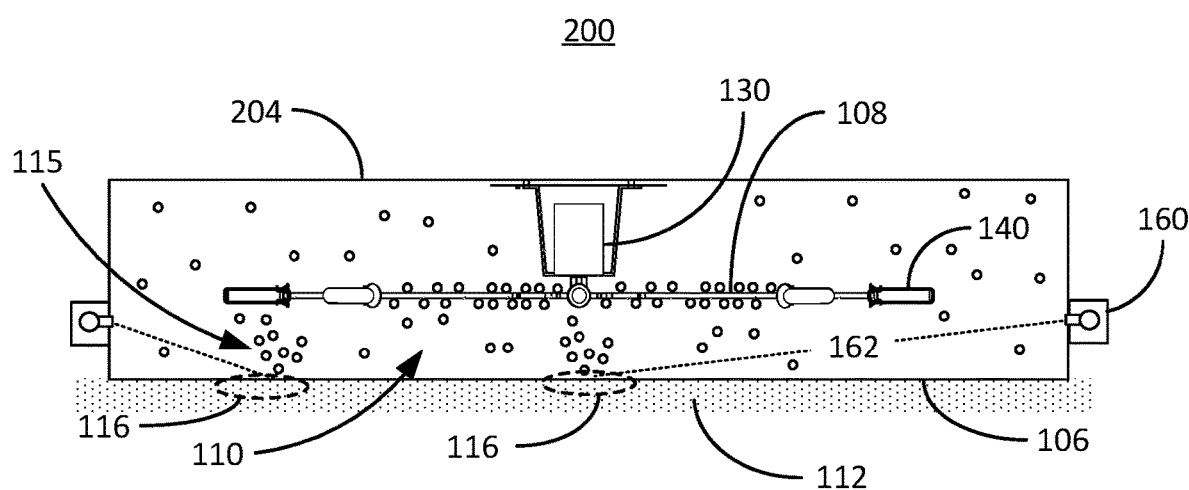
FIGS. 3A and 3B are line drawings of another embodiment of a vapor collection system in operation consistent with embodiments of the present invention.
Figure 3B:
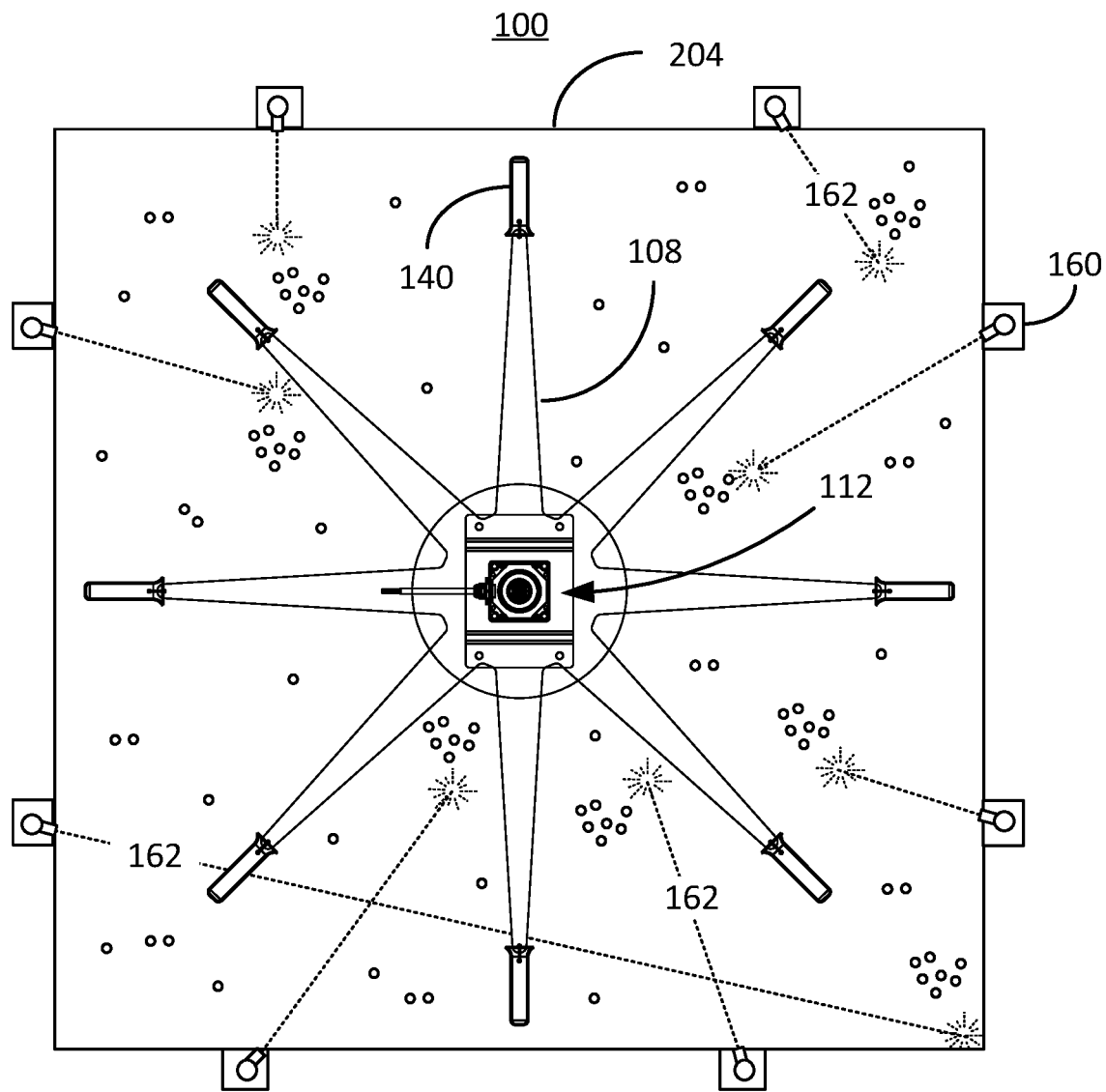

FIGS. 3A and 3B are line drawings of another embodiment of a vapor collection system in operation consistent with embodiments of the present invention. FIG. 3A is a side view of the vapor collection system embodiment 200 and FIG. 3B is a top-down view of the vapor collection system embodiment 200. As shown in these figures, instead of a dome shaped cover, this vapor collection system 200 comprises a square shaped cover 204. The square shaped cover 204 provides a more efficient extraction of the vaporized target materials 115 from the regolith 112 because mining the Moon's surface can be accomplished via a patchwork of squares by simply moving the cover 204 from a mined square patch to an unmined square patch, thus mining a row of regolith 112. As shown in FIG. 3A, the laser system 160 directs the laser beam 162 across the regolith surface 112 ablading the regolith 112, which in some embodiments is between 2 mm and 2 cm deep, for example, thereby liberating the target gaseous material 115 from the regolith 112. The liberated target gaseous material 115 naturally disperses in the internal volume 110 defined by the cover 204. As the chilled blades 108 rotate, target gaseous material 115 condenses onto the blades 108 and migrates as droplets 150B to the collection tubes 140. In this embodiment, there are multiple lasers 160 simultaneously ablading the regolith 112.

Figure 4:
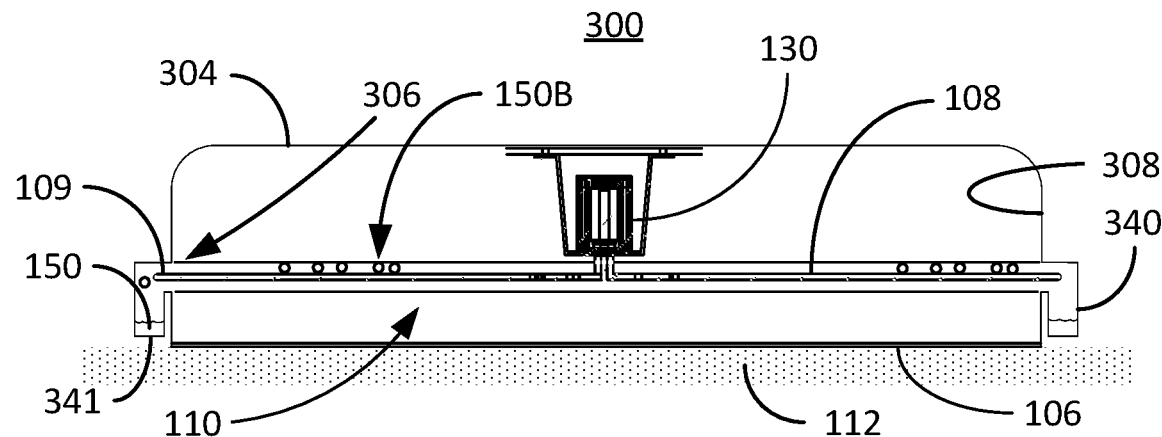
FIG. 4 is a line drawing that illustratively depicts an optional condensed target material collector consistent with embodiments of the present invention.

FIG. 4 is a line drawing that illustratively depicts an optional condensed target material collector consistent with embodiments of the present invention. As shown, the vapor collection system embodiment 300 is very similar to the systems 100 and 200 but instead of using collection tubes 140, the vapor collection system embodiment 300 relies on a circular slot 306 in the cover sidewall 308 that leads to a reservoir 310 that holds the condensed target material 150 that drips into it. Hence, as the condensation blades 108 spin inside of the internal volume 110 of the cover 304, the condensation droplets 150B that form on the cold/chilled condensation blades 108 migrate to the blade distal ends 109 that are spinning inside of the circular slot 306 located in the cover sidewall 308. The liquid 150 drips into one or more receptacles 341 that is in communication with the slot 340. The vapor collection system embodiment 300 works if there is gravity, which on the Moon is about ⅙ of that on Earth.

Figure 5A:
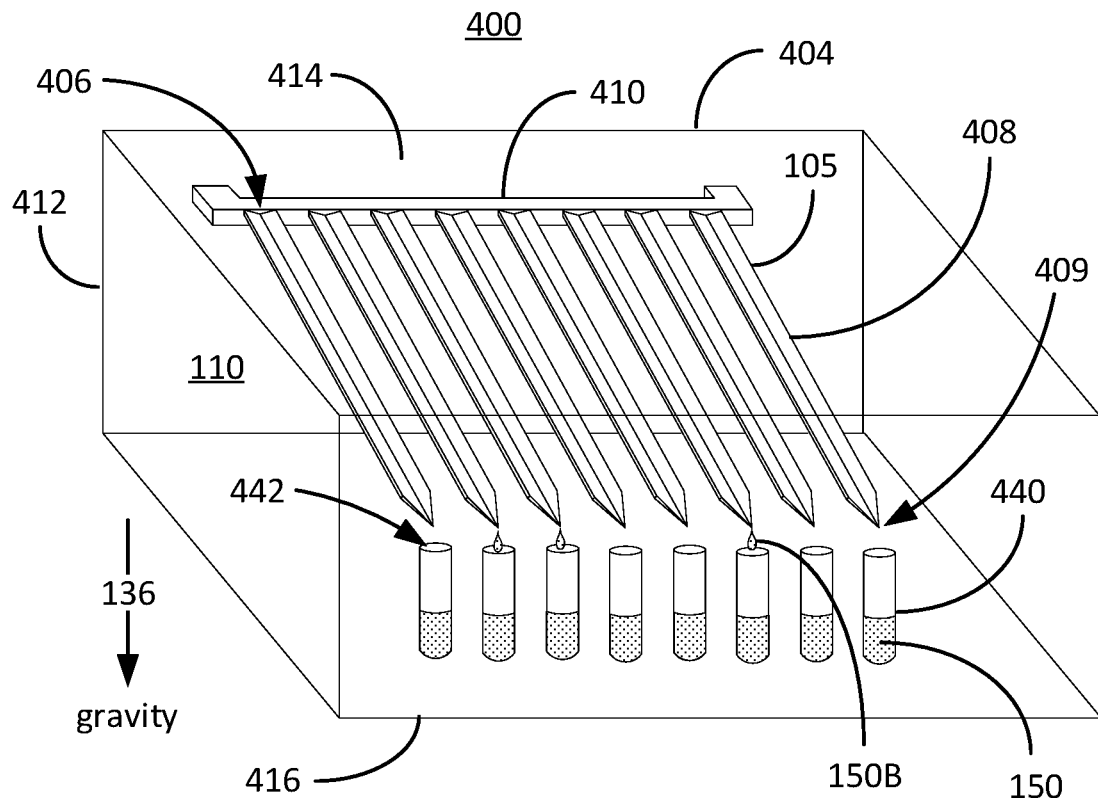
FIGS. 5A-5B are line drawings of yet another vapor collection system consistent with embodiments of the present invention.
Figure 5B:
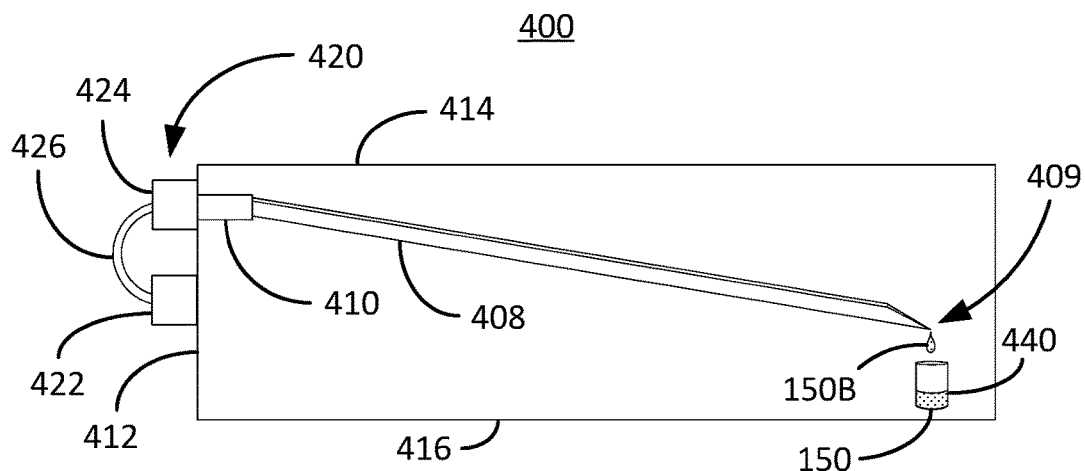

FIGS. 5A-5B are line drawings of yet another vapor collection system consistent with embodiments of the present invention. FIG. 5A is an isometric view of a vapor collection system embodiment 400 that comprises a plurality of static/fixed condensation blades 408 (which act as the condensation surface 105) that use gravity to migrate condensation droplets 150B to collection tubes 440. As shown here, the vapor collection system 400 comprises a plurality of V-shaped condensation blades 408 that are angled downward from each of their proximal ends 406. Optional embodiments contemplate the condensation blades having shapes that are not V-shaped, for example, flat, U-shaped, corrugated, etc. The blade proximal ends 106 are attached to a cryogenic liquid distribution conduit 410, which channels cryogenic liquid (not shown) that flows through the condensation blades 408 to chill them to temperatures that will cause condensation of target gaseous material 115. Under the influence of gravity, the condensation droplets 150B will migrate to the distal drip edge 409 of the condensation blades 408 where the droplets 150B drip into the collection tubes 440 via their respective collection tube inlet ports 442. The condensed target material 150 accumulates in the collection tubes 440 as shown. Of course, gravity (shown by the arrow 136) is required for the vapor collection system 400 to work. The plurality of condensation blades 408 are disposed in the internal volume 110 of the cover 404. The cover 404 is defined by a cover top surface 414, cover sidewalls 412 and a cover rim 416 that defines an open side that rests atop regolith 112.

FIG. 5B is a side view line drawing of the vapor collection system 400 of FIG. 5A depicting the blade cooling system 420. This blade cooling system 420 generally comprises a cryogenic fluid reservoir 422 that holds the cryogenic fluid, which is accessed by a pump 424. The pump 424 circulates the cryogenic fluid through the cryogenic liquid distribution conduit 410 and into tubes (not shown) in the blade 408. The cryogenic fluid is used to chill the blade 408 to temperatures that will cause condensation of target gaseous materials 115 on to the surface of the blade 108. The cryogenic fluid can include liquid nitrogen, liquid oxygen, liquid hydrogen and liquid helium, for example. The condensed droplets 150B migrate along the blade 408 towards the distal drip edge 409 under the influence of gravity. When the condensed droplets 150B reach the distal drip edge 409, the condensed droplets 150B drip into the collection tube 440 where the condensed target material 150 is retained.

Figure 5C:
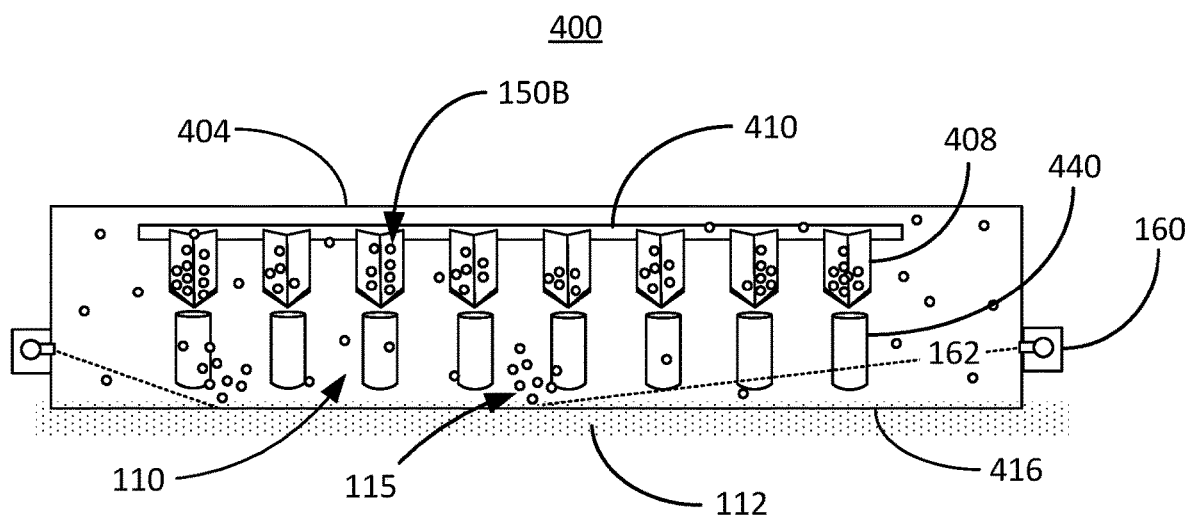
FIG. 5C is a front view line drawing that of the vapor collection system of FIG. 5A depicting target gaseous material being vaporized.

FIG. 5C is a front view line drawing of the vapor collection system 400 of FIG. 5A depicting target gaseous material 115 being vaporized by way of a laser beam 162 (the laser beam 162 is generated by a laser 160 that is configured to sweep across the surface of regolith 112). As shown, the target gaseous material 115 is dispersed in the internal volume 110 of the cover 404 that rests on the regolith surface 112 by way of the cover rim 460. The target gaseous material 115 condenses as droplets 150B on the cryogenically chilled blades 408 where the condensation droplets 150B drip into the collection tubes 440. The cryogenic liquid distribution conduit 410 is shown here for reference.

Figure 6A:
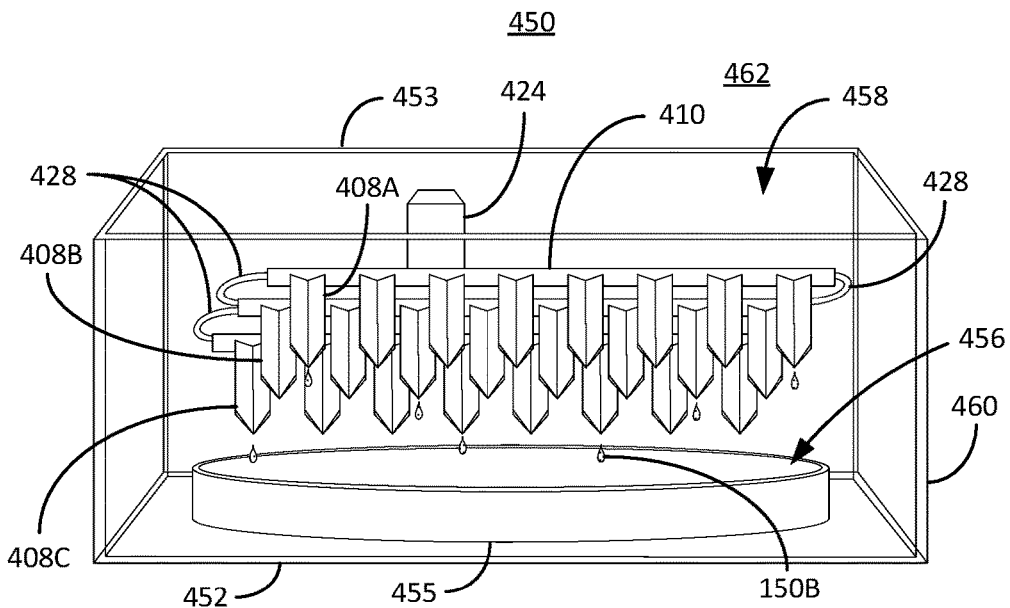
FIGS. 6A and 6B are line drawings showing yet another vapor collection system embodiment that has no cover but rather only sidewall shields consistent with embodiments of the present invention.
Figure 6B:
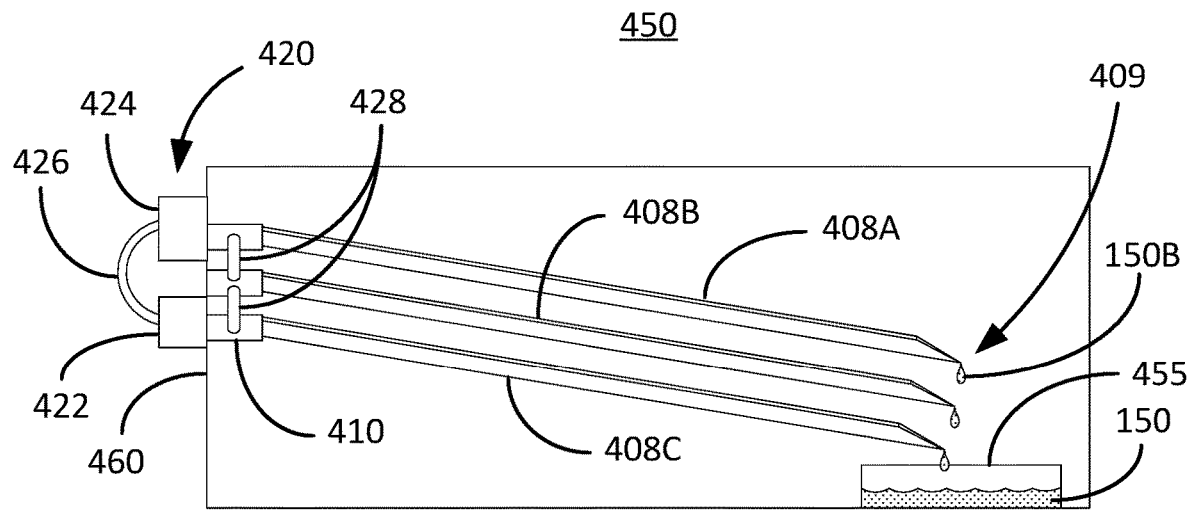

FIGS. 6A and 6B are line drawings showing yet another vapor collection system embodiment that has no cover but rather only sidewall shields consistent with embodiments of the present invention. As shown in FIG. 6A, the vapor collection system embodiment 150 comprises three rows of condensation blades 408 that are surrounded by a sidewall shield 460. Fewer or more rows can be employed without departing from the scope and spirit of the present embodiment. The sidewall shield 460 is transparent to see the block diagram elements therein. The sidewall shield 460 has no top side and no bottom side. The bottom shield rim 452 is configured to rest on top of regolith 112 and the upper lip 453 provides unobstructed exposure opening 458 of the blades 408 to the heavens (exterior environment 462) to assist in the cooling effects of the blades 408. The blades 408A-408C act as a cover that covers at least 70% of an upper surface area 454 defined by the perimeter of the top edge 453. The sidewalls 460 extend from the bottom shield rim 452 to the top edge 453. The condensation rows 408A, 408B and 408C are staggered to essentially block any line of sight of liberated gaseous molecules or atoms 115 from the regolith 112 to the exterior environment 462. In other words, the liberated gaseous material 115 has a high probability of impacting or otherwise landing on the surface of the condensation blades 408 and a low probability of escaping into the heavens. The condensation blades 408 are cooled via cryogenic liquid that is pumped 424 from one cryogenic liquid distribution conduit 410 to another by way of connecting lines 428 in series. Optionally, the cryogenic liquid is pumped to individual distribution conduits 410 in parallel. The target gaseous material 115 is configured to condense as droplets 150B on the cryogenically chilled blades 408 where the condensation droplets 150B drip into a collection receptacle 455 via a receptacle inlet region 456.

FIG. 6B is a side view line drawing of the vapor collection system embodiment 450 of FIG. 6A. The three condensation rows 408A, 408B and 408C are shown collecting and dripping the target gaseous material 115 into the collection receptacle 455. The distal drip edges 409 are staggered in this configuration to provide a clear path for the condensation droplets 150B to drip and collect 150 into the collection receptacle 455. As shown, the vapor collection system embodiment 150 comprises a cryogenic reservoir 422 that is mounted on the sidewall shield 460 along with the pump 424 that are connected by way of a cryogenic transfer line 426. Also shown are the cryogenic connection lines 428 that link together the cryogenic liquid distribution conduits 410. In this embodiment, the absence of a cover enhances the radiative cooling effects of the dark outer space directly facing the blades 408.

Cooling down a condensation surface 105 (such as a condensation blade 108 or 408 for example) to temperatures that will condense and liquefy nitrogen, oxygen, hydrogen, helium, etc., on the Moon is a challenging task due to the extreme environmental conditions and lack of atmosphere. To boost heat transfer and energy exchange to chill a condensation surface 105, high conductive and in some cases high emissivity coatings are considered to boost cooling efficiency. Such high conductive materials are commonly known to include silver, copper, gold and aluminum, just to name a few. Certain inventive aspects contemplated herein take advantage of the lack of an appreciable atmosphere and the extreme low temperatures in shaded regions of the Moon. For example, the temperatures at the poles on the Moon can sink below 20° Kelvin, which can greatly boost the efficiency to the lower temperature of the blades 408. Also, exposing a smooth/high emissivity surface to outer space can improve lowering temperatures though radiative heat exchange. For these reasons, certain aspects of the present invention envision mining the target gaseous materials 115 in these colder regions of the Moon. However, the inventive aspects of the present invention will work on wormer and sunny sides of the Moon albeit, likely less efficiently.

Figures 7A, 7B:
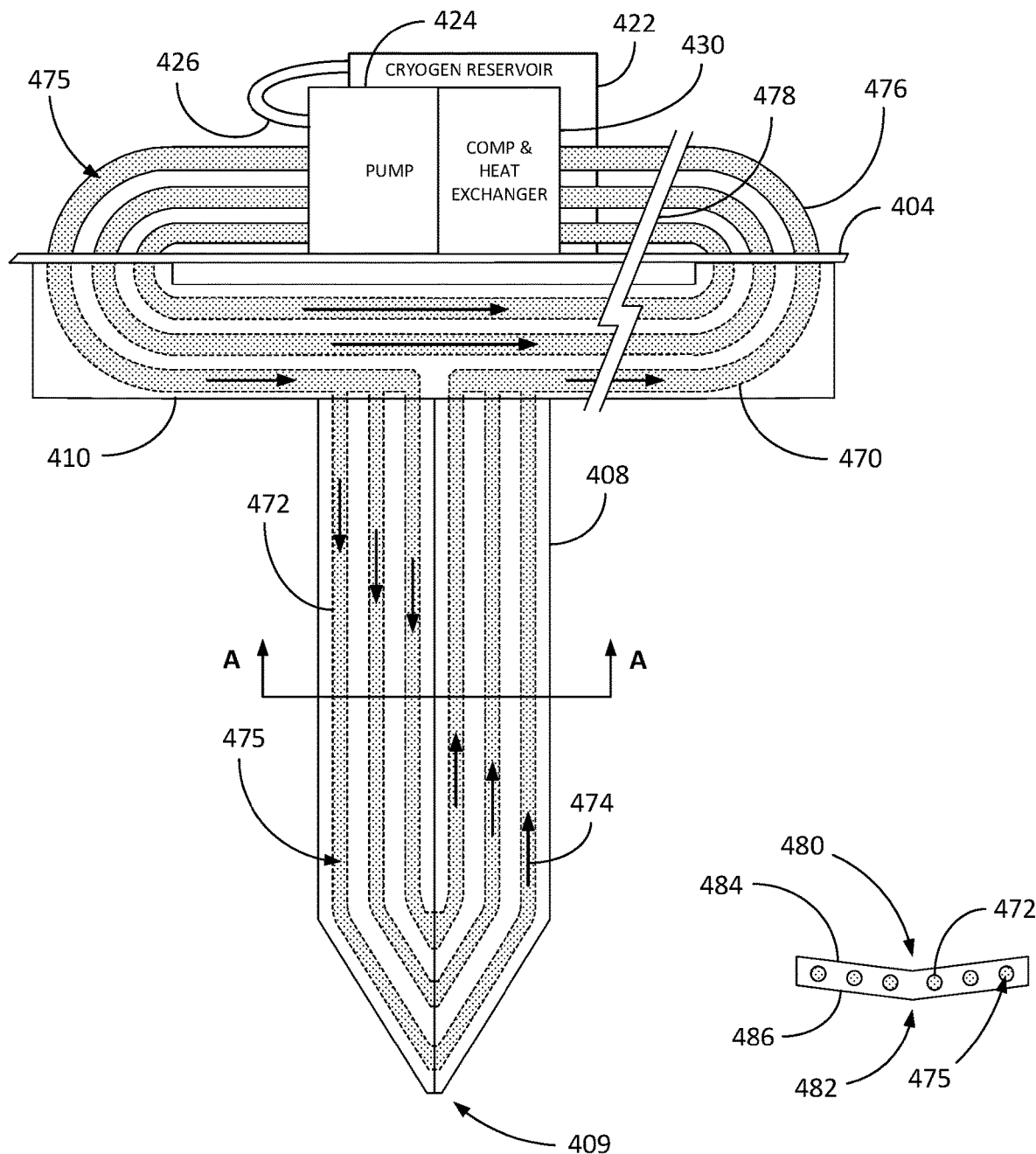
FIGS. 7A and 7B are line drawings depicting an active blade chilling embodiment consistent with embodiments of the present invention.

FIGS. 7A and 7B are line drawings depicting an active blade chilling embodiment consistent with embodiments of the present invention. Active cooling employs cooling methods to remove heat from the condensation surface 105. The most common technique is to use a cryogenic refrigeration system based on the principle of mechanical refrigeration. This system comprises a compressor, a condenser, an expansion valve, and a heat exchanger, which can be an evaporator. One embodiment of the present invention depicts the blade 408 from FIG. 5A, comprising a plurality of cryogenic heat exchange tubes 472 that loop inside of the blade 408. As shown in the cross-section along cut-lines B-B of FIG. 7B, the heat exchange tubes 472 have a cross sectional shape that is circular (but could optionally be some other shape, such as rectangular or elliptical, to name a couple) that are embedded in the blade 408 between a blade top surface 484 and a blade bottom surface 486. The blade 408 is V-shaped in this embodiment providing a concave 'trough' at the top surface 484 and a convex peak 482 at the bottom surface 486 to concentrate the condensation droplets 150B to more efficiently carry them to the distal drip edge 409. Cryogenic fluid 475 is pumped through the heat exchange tubes 472 as shown by the cryogenic fluid flow arrows 474 in FIG. 7A.

With greater detail, FIG. 7A depicts the movement of cryogenic fluid 475 through channels 468 in the blade 408. More specifically, the cryogenic fluid 475 is circulated via the pump 424 through the cryogenic feed lines 476 that feed the cryogenic fluid 475 to the distribution conduit channels 470 in the insulated cryogenic liquid distribution conduit 410, which feed the heat exchange tubes 472 in the blades 408. The compressor and heat exchanger 430 can be configured in several ways to cool the cryogenic fluid 475 including a radiator that simply radiates heat gathered in the blades 408 to the Moon's atmosphere, or by sublimation cooling, such as via a medium like dry ice, for example, configured in a similar manner to the cooling system used in a space suit and known to those skilled in the art. The cryogenic reservoir 422 is an insulated container, which contains the cryogenic fluid 475 that supplies the channels 468. The fluid path follows the arrows 474. A portion of the cryogenic liquid distribution conduit 410, distribution conduit channels 470, the cover 404 and the cryogenic feed lines 476 are cut away by way of the cut 478. A system compression cut-line 478 slices through a portion of the cryogenic liquid distribution conduit 410, distribution conduit channels 470, the cover 404 and the cryogenic feed lines 476 are cut away by way of the cut 478 to isolate a single blade 408. The system compression cut-line 478 streamlines the drawing in FIG. 7A.

Optional techniques to chill a blade 408 contemplates using thermoelectric coolers (TECs), which can be embedded in a blade 408 to actively remove heat by exploiting the Peltier effect. However, because TECs may have limitations in achieving very low temperatures, TECs may be used in combination with other cooling techniques.

As discussed in conjunction with embodiment of FIG. 6A, radiative cooling can further boost cooling the blades 408 by directing the blades 408 towards the cold lunar sky because the Moon's surface experiences extremely low temperatures during the lunar night.

Another embodiment of the present invention contemplates using laser cooling to achieve temperatures of below 3° Kelvin by exploiting the principles of quantum mechanics. In a process that involves manipulating the momentum of atoms through the selective absorption and remission of photons, this cooling mechanism relies on the Doppler effect in the recoil from photon absorption, causing the blade surface material to lose kinetic energy and consequently lower in temperature. Careful control of laser frequency and intensity, laser cooling may optionally be used to lower temperatures to collect helium-3.

Figure 8:
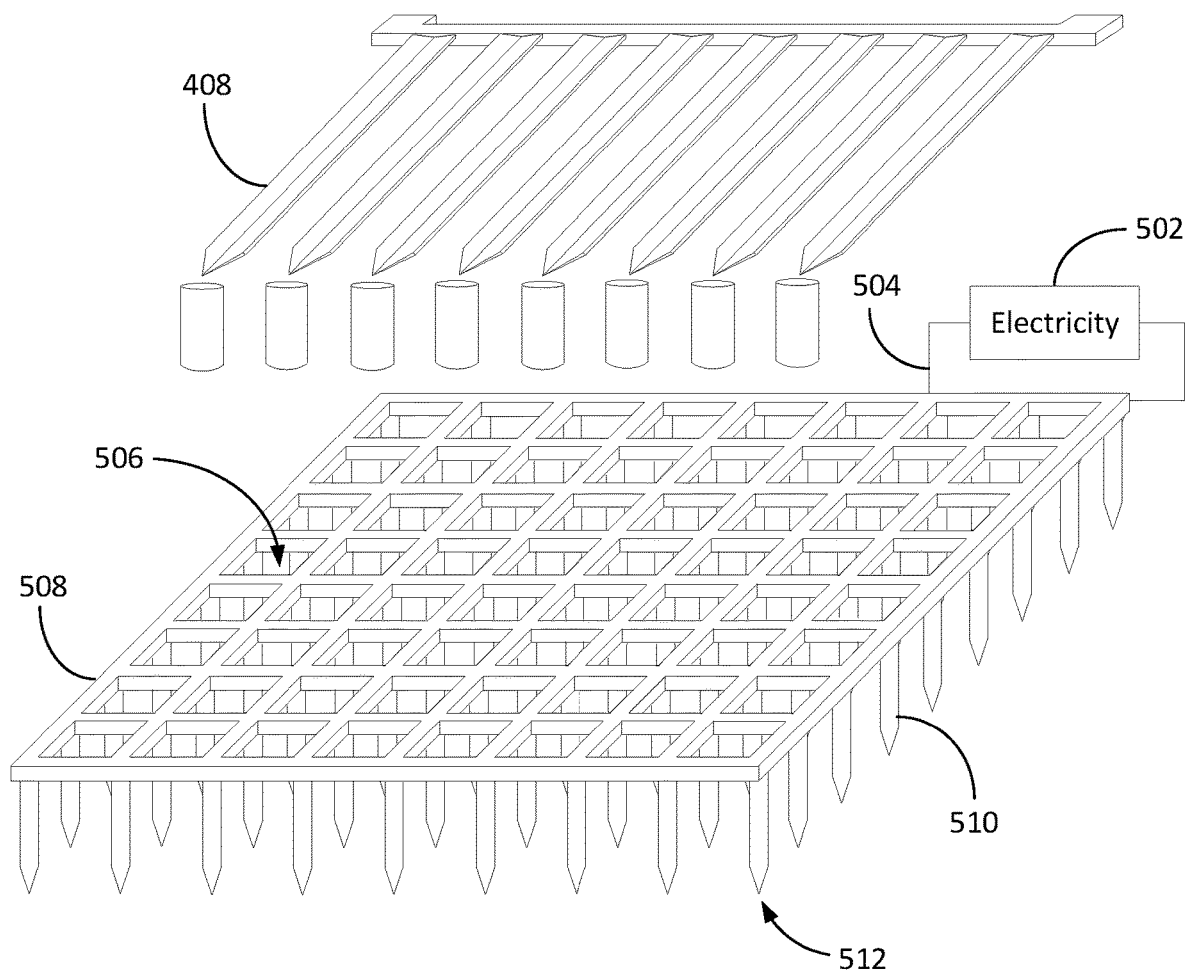
FIG. 8 is a line drawing that illustratively to depicts an optional regolith heating embodiment consistent with embodiments of the present invention.

FIG. 8 is a line drawing that illustratively to depicts an optional regolith heating embodiment consistent with embodiments of the present invention. This regolith heating embodiment 500 is one of many possible embodiments to raise the temperature of the regolith 112 at which the target gaseous material retained therein is liberated from the regolith 112. Certain embodiments envision that in addition to heating the regolith 112, chemicals, such as fluorine, can also be used to assist in liberating the target materials from the regolith 112. In this embodiment, a plurality of heated spikes 510 penetrate the surface of the regolith 112 by way of a sharp spike tip 512. The heated spikes 510 extend from the bottom of a screen/lattice 508 wherein the screen/lattice 508 comprises a plurality of openings 506 that provide a pathway for the liberated target gases 115 to escape from the regolith 112 and pass into the internal volume 110 (shown in the previous FIGS.). A block diagram of an electrical circuit 502 with electrical connecting lines 504 is shown to illustrate a power source to heat the spikes 510. This particular heating embodiment 500 is shown in conjunction with an arrangement that includes static condensation blades 408 from FIG. 5A, however it can be equally used with the rotary blades 108. One of the benefits of the laser heating source 160 over this embodiment is that there is the potential for lowering residual heat emanating from the surface of the regolith 112. Residual heat from the present embodiment 500 may add to the difficulty of chilling the blades 108 to below condensation temperatures of the target gaseous material 115.

Figure 9:
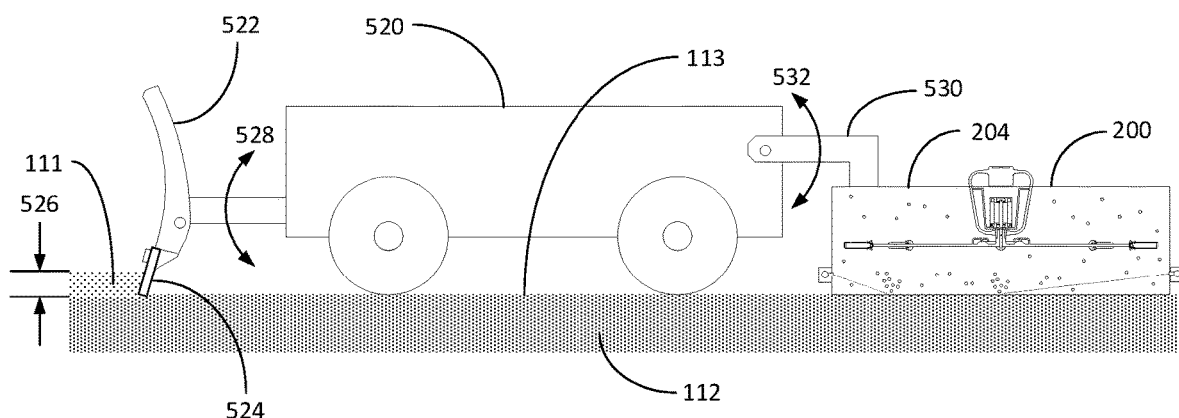
FIG. 9 is a line drawing that illustratively depicts a carrier vehicle, such as a rover, that supports a vapor collection system consistent with embodiments of the present invention.

FIG. 9 is a line drawing that illustratively depicts a carrier vehicle, such as a rover, that supports a vapor collection system consistent with embodiments of the present invention. The vapor collection system 200 is used here for example, however other vapor collections system embodiments can equally be used. One advantageous embodiment envisions the rover 520 providing all necessary power to operate the vapor collection system 200 and may further contain a sufficient amount of cryogenic fluid or support certain functionality of the vapor collection system 200, such as a cooling means to maintain the cryogenic fluid. However, optional embodiments contemplate the vapor collection system 200 having some, if not total, power capability that is independent of the rover 520, such as battery or solar power for example. As depicted, the rover 520 can include a vapor collection system support 530 that is configured to place the vapor collection system 200 on the regolith surface 113 so that the vapor collection system 100 can effectively mine new regolith 112 rich in the target material 115. Certain embodiments envision mining the regolith of the target material 115 down to a depth 526 of between 2 mm and 40 mm, for example. The vapor collection system support 530 lifts and lowers the vapor collection system 200 on the regolith surface 113, as shown by the collection system articulation arrow 532. The vapor collection system 200, in this embodiment, comprises a rectangular cover 204 that permits mining in a rectangular footprint. Hence, the rover 520 moves the vapor collection system 200 from one rectangular footprint to another, which more efficiently mines the regolith 112. Accordingly, this arrangement is configured to mine rows of regolith 112 at progressive depths. Hence, on a first pass along a regolith row, the plow 522 is raised to allow the vapor collection system 200 to access the untouched regolith 112. On ensuing passes, the plow 522 is lowered to a depth 526 (predetermined or determined by sampling target material concentration) that exposes unmined regolith rich in the target material 115. In other words, the plow 522 pushes away denuded regolith 111 that has been somewhat depleted of the target material 115 (depleted to a determined concentration of target material 115). FIG. 9 depicts the plow blade 524 extending on a front end of the rover 520 lowered 528 into the regolith to clear away the denuded regolith 111 (depicted with black and white dots that are less dense than the regolith 112) at a designated depth 526. In this way, the rover 520 can mine back and forth along a row of regolith 112 until it is considered reasonable to mine a new row. The plow blade 524 can be located under the rover 520, on the back of the rover 520 or elsewhere as long as it is able to clear away regolith for a new pass of the vapor collection system 200.

Figure 10A:
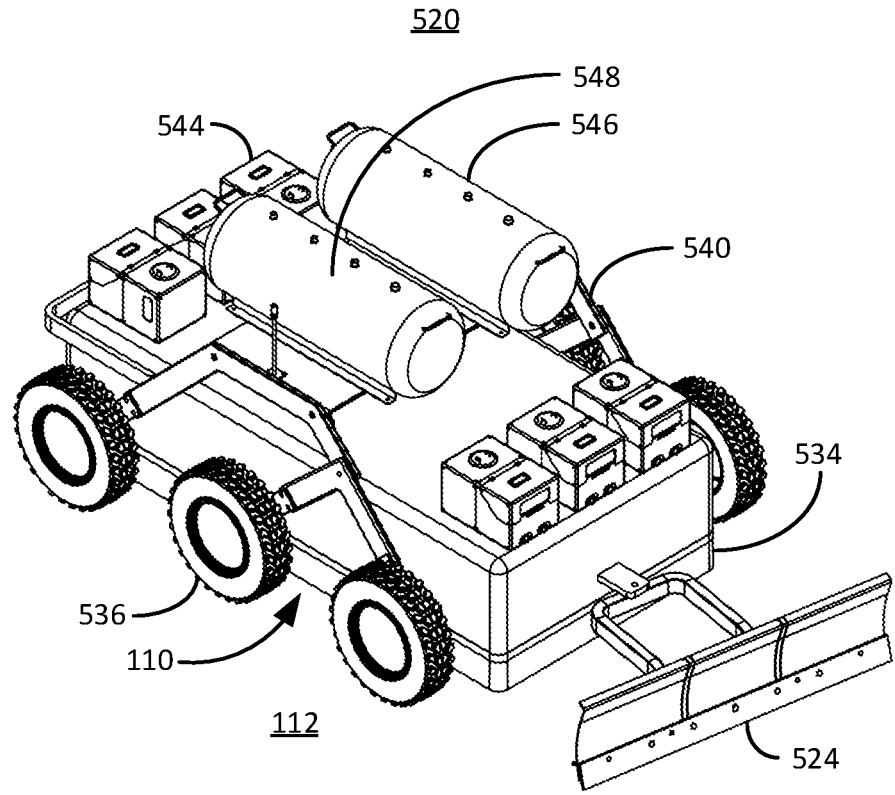
FIG. 10A is another embodiment of the present invention depicting a rover and blade system consistent with embodiments of the present invention.

FIG. 10A is another embodiment of the present invention depicting a rover and blade system consistent with embodiments of the present invention. As depicted, this rover embodiment 520 comprises a mining arrangement of which a majority is in the cover 534. The cover 534 is configured to rest atop regolith 112 thereby creating a shielded environment 110 to trap gaseous material 115 liberated from the regolith 112. As mentioned earlier, regolith 112 is an embodiment of extraterrestrial granular soil. The rover 520 comprises six wheels 536 that are mounted to a rocker-bogie suspension 540 that is designed to traverse uneven terrain. In this embodiment, the rover 520 uses electric batteries 544, wherein the batteries 544 could easily be augmented with solar collectors (not shown). A plow blade 524 is configured to pivot right and left, as shown, in addition to being lifted, lowered, and tilted. This rover embodiment 520 comprises a gas collection tank 546 and a liquefied gas reservoir tank 548. The gas collection tank 546 is configured to collect target gaseous material 115 (when referenced by call-out label below, refer to FIG. 3A for illustrative depiction) liberated from the regolith 112 and the liquefied gas reservoir tank 548 is configured to provide liquefied gas to the collection system 105, wherein some embodiments of the collection system 105 reside in the shielded environment 110.

Figure 10B:
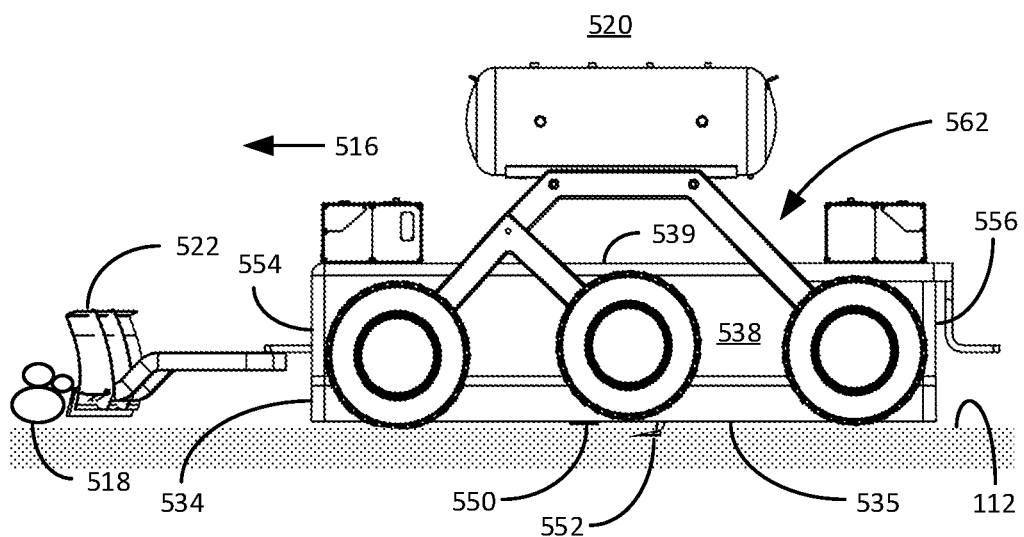
FIG. 10B is a side view line drawing of the rover of FIG. 10A depicting a front regolith moving blade and a rear regolith moving blade.

FIG. 10B is a side view line drawing of the rover 520 of FIG. 10A supporting a mining arrangement 562 that illustratively depicts a front regolith moving blade 550 and a rear regolith moving blade 552. The blades 550 and 552 extend from the cover rim 535 located at the bottom of the cover 534. As shown, the front regolith moving blade 550 is above the rear regolith moving blade 552. In this configuration, the front blade 550 is higher than the rear blade 552. Hence, the front blade 550 clears a top layer of regolith 112 and the rear blade 552 clears a deeper layer regolith 112 (below the top layer regolith 112) when the rover 520 is moving in a forward direction 516. As the rover 520 moves in the direction of the arrow 516 (i.e., where the rover front 554 leads the rover rear 556), large debris/rocks 518 are pushed out of the way via the plow 522 while the regolith 112 is turned over by the front regolith moving blade 550 and a rear regolith moving blade 552. Shown for reference is the cover body 538 extending upwards from the rim 535 to the cover top 539.

Figure 10C:
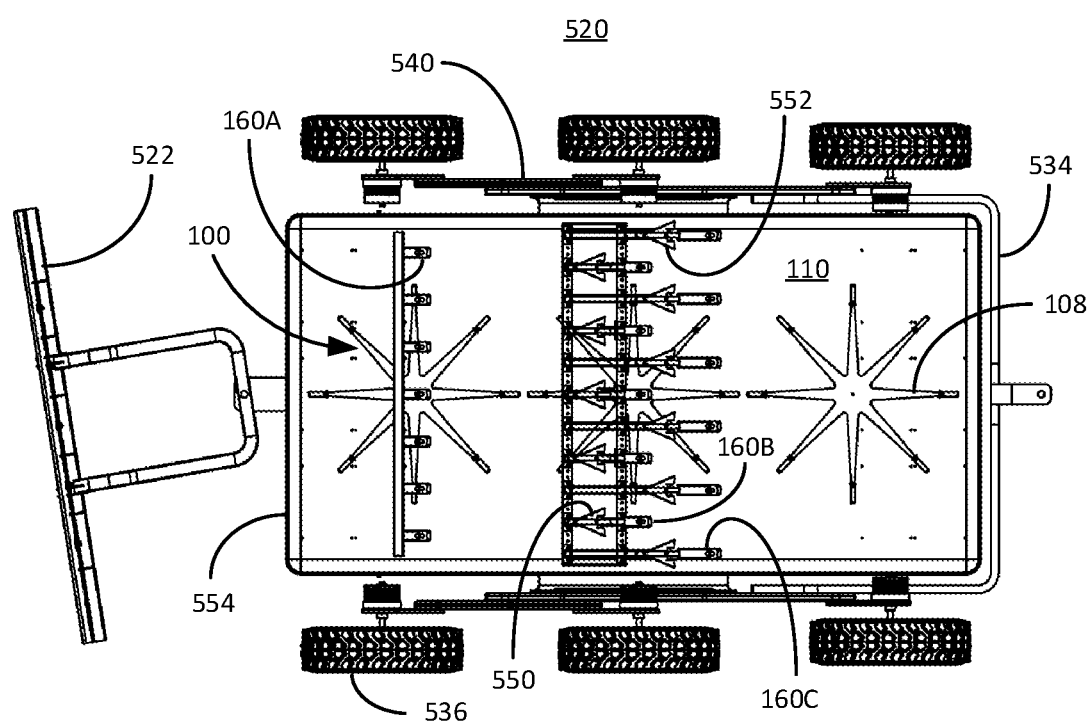
FIG. 10C is a bottom view of the rover looking up inside of the cover consistent with embodiments of the present invention.

FIG. 10C is a bottom view of the rover 520 looking up inside of the cover 534 consistent with embodiments of the present invention. As shown, the internal volume 110 inside of the cover 534 includes a vapor collection system 100 that includes three condensation blade arrangements 108 as depicted in FIG. 1A. As should be appreciated, other vapor collection system embodiments can be placed in different locations inside of the internal volume 110 without departing from the scope and spirit of the present invention. This rover embodiment 520 includes six treaded wheels 536 mounted to a rocker-bogie suspension 540, however other propulsion arrangements, such as continuous track treads for example, can be equally employed. From this perspective, a row of laser heat sources 160A are disposed near the rover front 554, which heats the regolith 112 before it has been disturbed by the blades 550 and 552. The front row of laser heaters 160A are intended to liberate target gasses 115 from the top layer of regolith 112 (up to 2 cm depth, for example, though it could be more or less). There are two more rows of laser heat sources 160B and 160C disposed near the front regolith moving blade 550 and a rear regolith moving blade 552, respectively. In this arrangement, the second row of lasers 160B are just behind the front row of regolith moving blades 550 but in front of the second row of regolith moving blades 552. The second row of lasers 160B is configured to heat and liberate gaseous material 115 from the first layer of regolith 112 turned over by the front regolith moving blade 550. The third row of lasers 160C are just behind the rear regolith moving blade 552 and are configured to liberate gaseous material 115 via heat produced from laser beams 162 generated by the third row of lasers 160C from the second layer of regolith 112, which is turned over by the rear regolith moving blade 552.

Figure 10D:
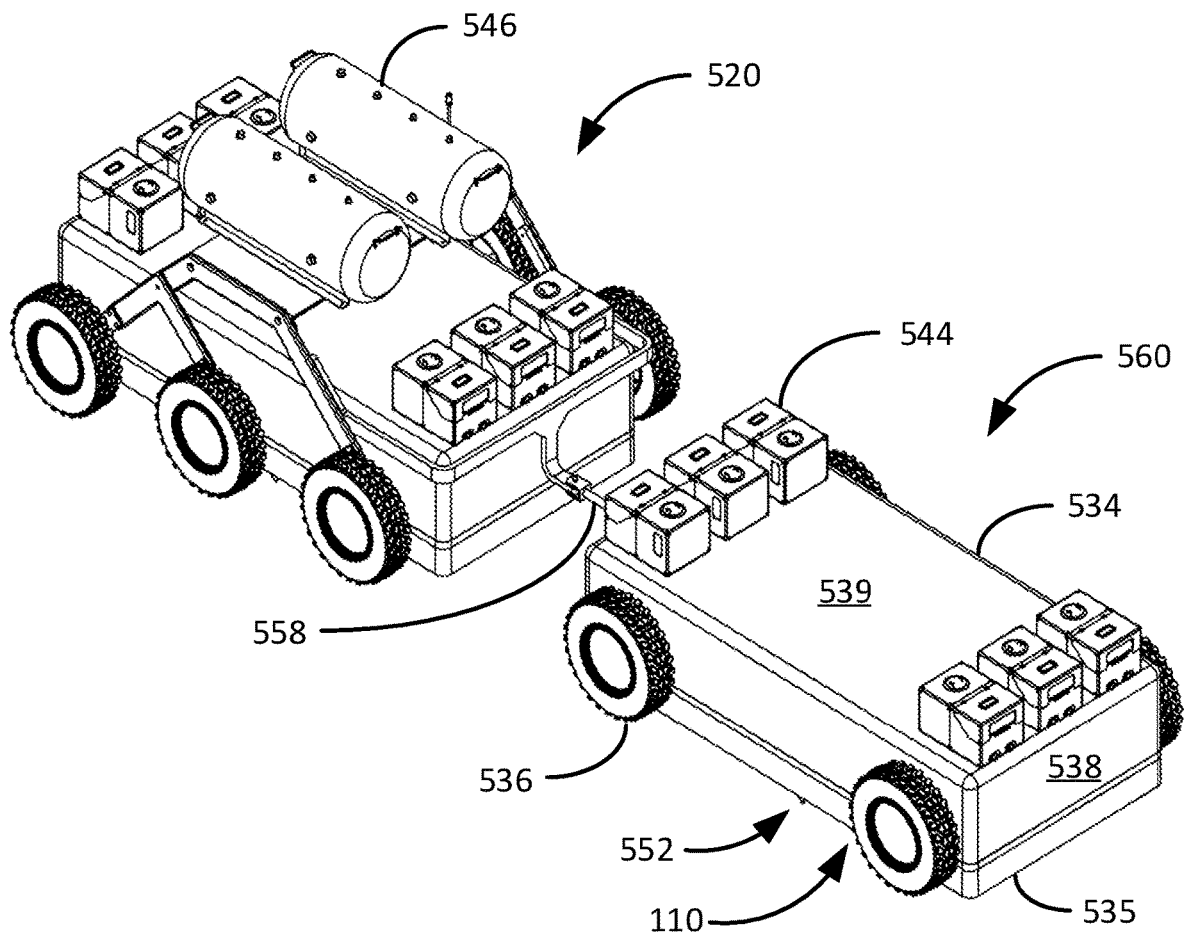
FIG. 10D is a line drawing illustratively depicting a rover pulling a secondary mobile gas collection arrangement via a connection linkage.

FIG. 10D is a line drawing illustratively depicting a rover 520 pulling a secondary mobile gas collection arrangement 560 via a connection linkage (tether) 558. The secondary mobile gas collection arrangement 560 comprises a cover 534 that is like the rover cover 534 but is not necessarily motorized to propel itself. In this embodiment, the secondary mobile gas collection arrangement 560 comprises four wheels 536 that are simply mounted to the cover body 538. As shown, a rear regolith moving blade 552 shown partially extending from the secondary mobile gas collection arrangement rim 535. There are batteries 544 attached to the secondary mobile gas collection arrangement cover top 539. And though there are no gas holding tanks integrated with or directly attached to the secondary mobile gas collection arrangement 560, certain embodiments envision gas holding tanks supported by the secondary mobile gas arrangement 539. Hence, in this embodiment any material collected in the secondary mobile gas arrangement internal volume 110 can be transferred to the gas collection tank 146 on the rover 520.

FIGS. 11A-11H illustratively depict a blade arrangement embodiment consistent with embodiments of the present invention that, in certain embodiments, are configured to be mounted inside of the cover 534 of FIGS. 10A-10D. FIG.

11A is a side view line drawing of a single plow blade arrangement 571 connected to a plow arm 576 that extends from a support beam 578. As shown, plow blade 570 is penetrating regolith 112 with the plow leading edge 572 churning the upper layer of regolith 112A and the lower layer of regolith 112B over via the plow face 574. The laser heating source 160, which can be powered via powerlines 161 connected to the batteries 544 on the rover 520, is configured to heat the regolith 112 by pointing a laser beam 162 on the regolith 112 at the plow trailing edge 577. This embodiment includes a couple of radiant heating elements 164 located in front of the plow leading edge 572 and behind the plow trailing edge 577. The radiant heating elements 164 are intended to liberate gaseous material 115 from the regolith in front and behind the plow blade 570, wherein the liberated gaseous material 115 is confined inside of the cover 534. The plow blade 570 is moving in the forward direction (arrow) 516 under the power of the rover 520.

Figure 11A:
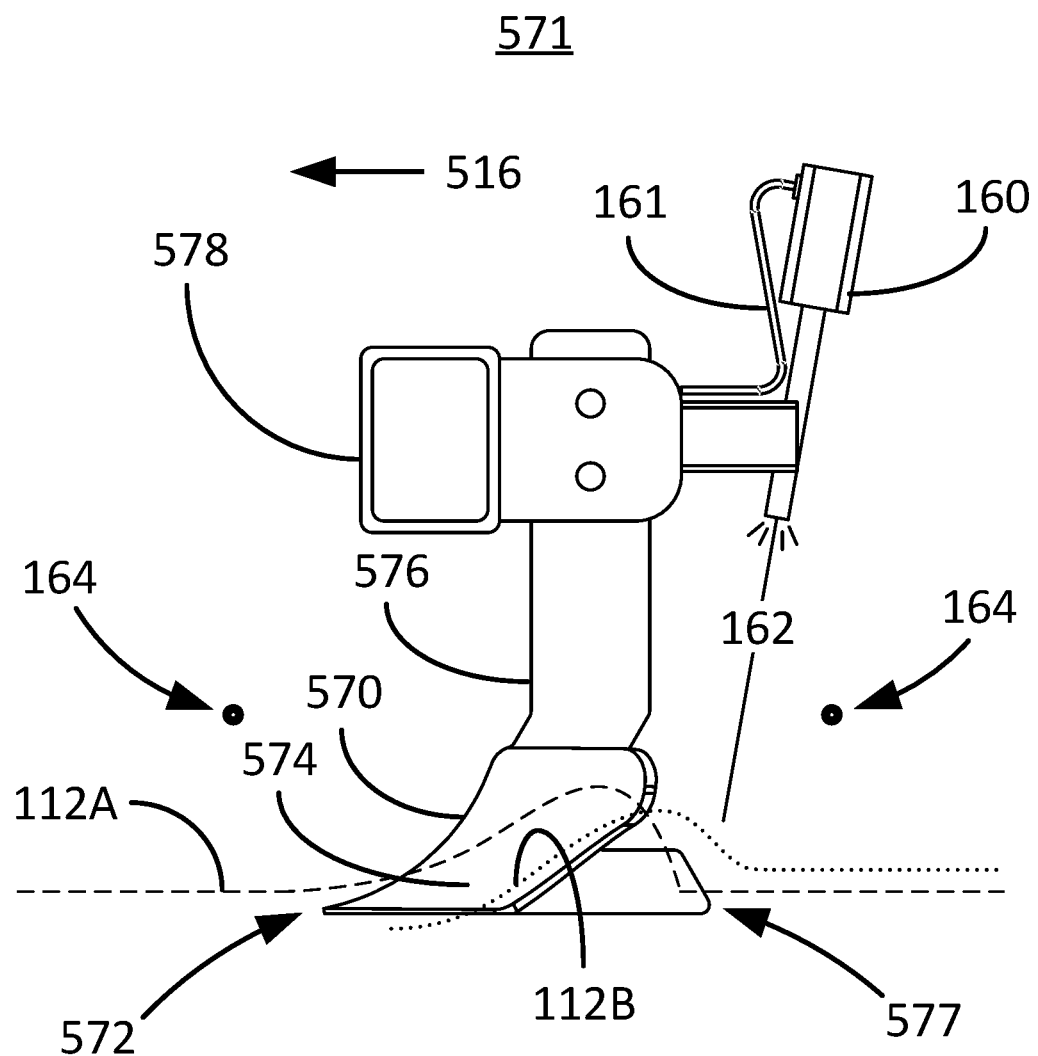
FIGS. 11A-11H illustratively depict a blade arrangement embodiment consistent with embodiments of the present invention that, in certain embodiments, are configured to be mounted inside of the cover of FIGS. 10A-10D.
Figure 11B:
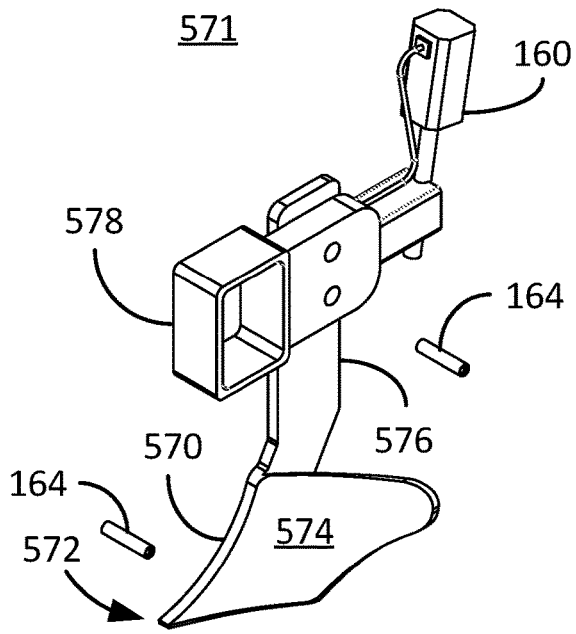
Figure 11C:
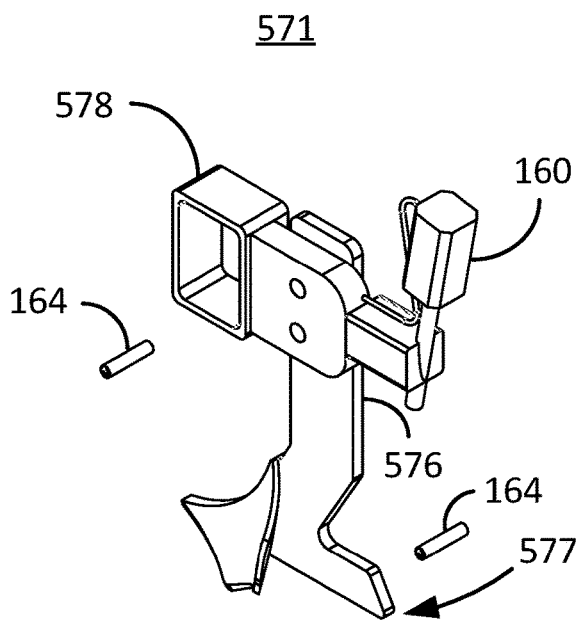

FIG. 11B is a front isometric view of the single plow blade arrangement 571 of FIG. 11A and FIG. 11C is a back isometric view of the single plow blade arrangement 571 of FIG. 11A. These different perspectives show the geometric relationship of the plow blade leading edge 572 of the plow 570 with the relationship of the heat sources 160 and 164 as well as the shape of the plow arm 576 and trailing edge 577. A section of the support beam 578 as shown to provide perspective as well.

Figure 11D:
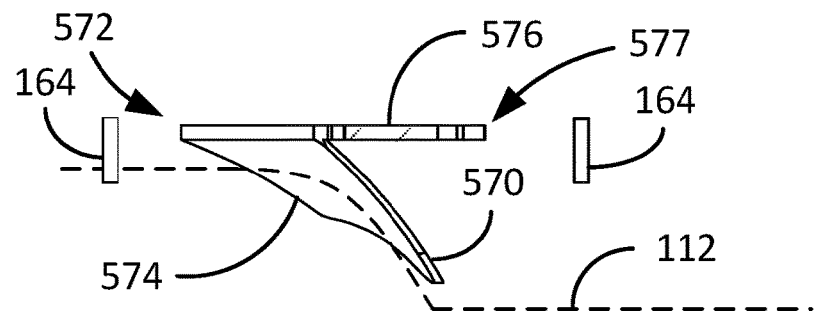

FIG. 11D is a top view line drawing of the plow blade 570 depicting the movement of regolith 112 across the plow face 574. The radiant heating elements 164 are shown in front of the leading edge 572 and behind the trailing edge 577.

Figure 11E:
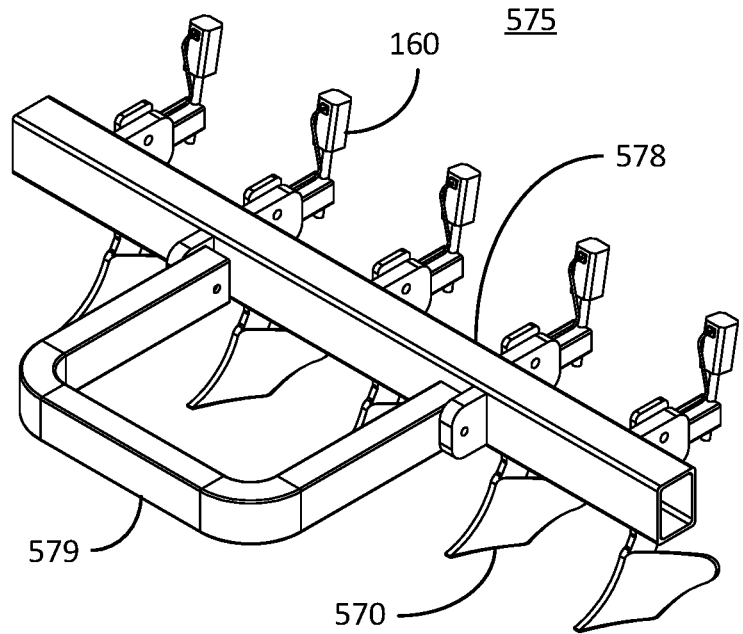
Figure 11F:
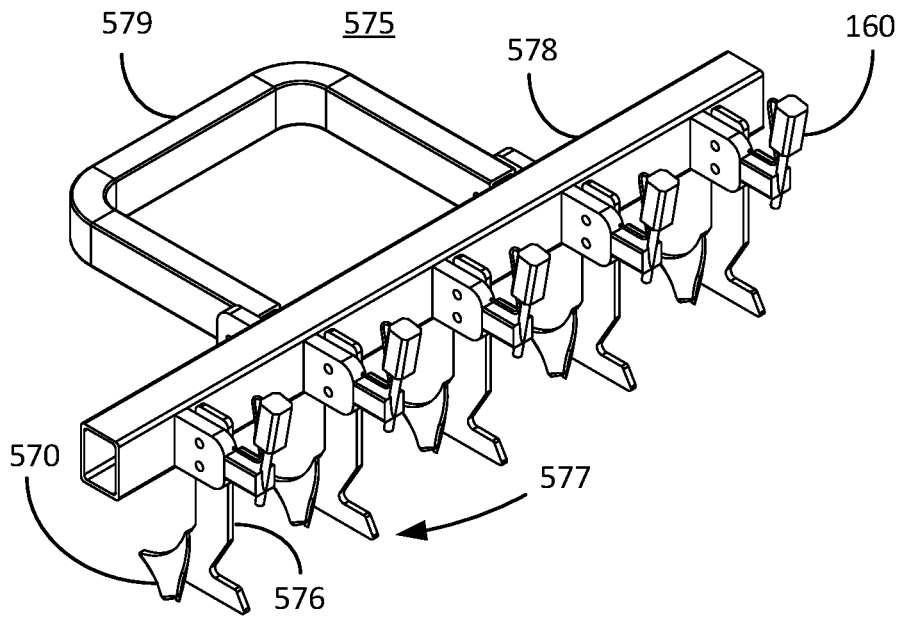

FIGS. 11E and 11F are front and back isometric line drawings of a single row plow arrangement 571 consistent with embodiments of the present invention. The single row plow arrangement 575 of FIG. 11E depicts a row of five plows 570 extending from a support beam 578 that is attached to a connector bracket 579. The connector bracket 579 mounts to the interior volume 110 of the cover 534. Each of the five plows 570 has a corresponding laser heating element 160 that is configured to sweep a heating laser beam 162 across the regolith 112 behind the corresponding plow 570. FIG. 11F depicts the trailing edges 577 of the five plows 570 in the single row plow arrangement 575. As shown, each of the five plows 570 are mounted to a corresponding plow arm 576. As also shown, each of the laser heating elements 160 are attached above a corresponding plow 570, all of which are attached to the support beam 578, which is connected to the connector bracket 579.

Figure 11G:
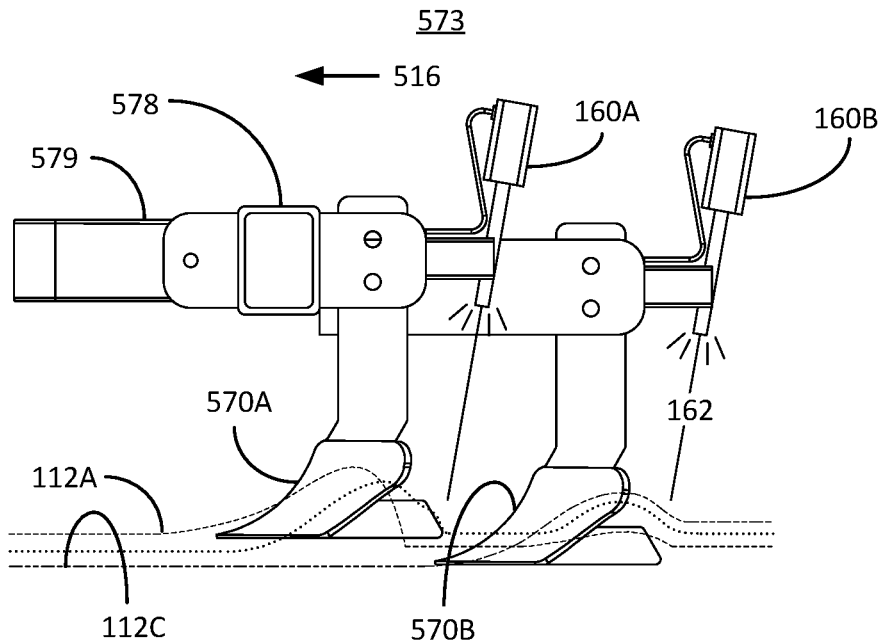
Figure 11H:
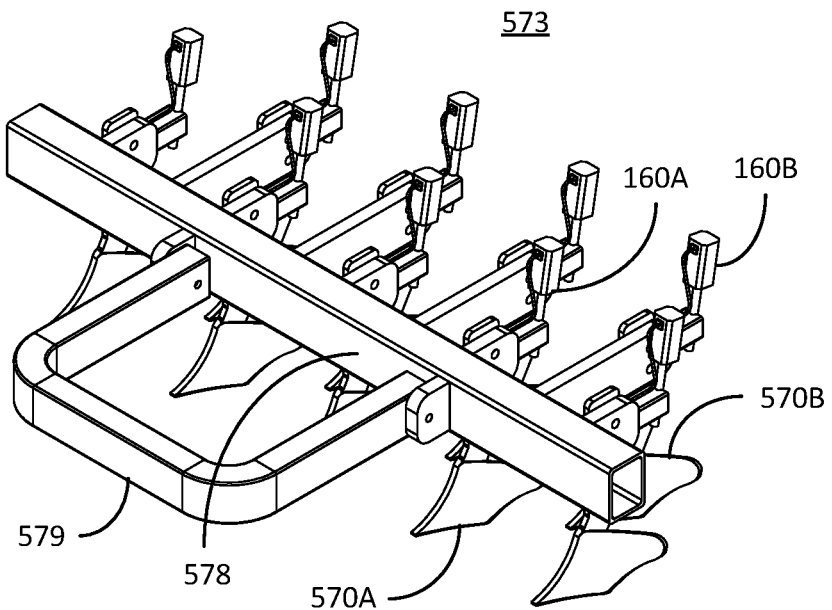

FIGS. 11G and 11H illustratively depict a double row plow arrangement 573 consistent with embodiments of the present invention. FIG. 11G is a side view line drawing of a double row plow arrangement 573 where a first plow row 570A is in front of and above a second plow row 570B. Accordingly, as the double row plow arrangement 573 moves in the direction of the arrow 516, a first plow row 570A turns over an upper layer of regolith 112A, wherein the first row of lasers 160A corresponding to the first plow row 570A heats the upper layer of regolith 112A via their laser beams 162 to liberate gaseous material 115 trapped in the upper layer of regolith 112A. The second plow row 570B turns over a lower layer of regolith 112C, wherein the second row of lasers 160B corresponding to the second plow row 570B heats the lower layer of regolith 112C to liberate gaseous material 115 trapped in the lower layer of regolith 112C. The first plow row 570A and second plow row 570B are connected support beam 578, which is connected to the connector bracket 579.

FIG. 11H is an isometric view line drawing of the double plow arrangement 573 showing the relative position of the first plow row 570A and the second plow row 570B as well as the corresponding lasers 160A and 160B. The support beam 578 and the connector bracket 579 are also shown here for reference.

FIG. 12A-12C are line drawings of various views of a single spike cultivator blade arrangement 581 consistent with embodiments of the present invention. The single spike cultivator blade arrangement 581 is envisioned to be mounted inside of the cover 534 of FIGS. 10A-10D. As shown in the side view line drawing of FIG. 12A, the single spike cultivator arrangement 581 is like the plow embodiments of FIG. 11A but with a spike cultivator blade 580 that turns a lower regolith layer 112B over an upper regolith layer 112A when the regolith 112 first encounters the spike cultivator blade tip 582 and moves up the spike cultivator blade face 584. As depicted, the lower regolith layer 112B and the upper regolith layer 112A are inverted following the spike cultivator blade trailing edge 587 during the forward motion 516. In operation (i.e., as the rover 520 moves forward 516), the upper regolith layer 112A is subjected to heat from the front radiant heater 164A, which liberates gaseous material 115 trapped in the upper regolith layer 112A. At the spike cultivator blade trailing edge 587, the lower layer of regolith 112B is subjected to heat from the laser beam 162 emitted from the laser 160 in addition to a rear radiant heater 164B, both of which liberate gaseous material 115 trapped in the lower regolith layer 112B. The spike cultivator blade 580 is attached to the distal end of a cultivator arm 586, which is attached to a support bracket 589. The support bracket 589 is connected to a support beam arrangement 588 that attaches the spike cultivator the inside of the cover 534.

FIG. 12B is a front isometric view of the single spike cultivator blade arrangement 581 of FIG. 12A. FIG. 12C is a back isometric view of the single spike cultivator blade arrangement 581 of FIG. 12A. These different perspectives show the geometric relationship of the spike cultivator blade leading edge 582 and trailing edge 587 in relation to the heat sources 160 and 164. As shown, the spike cultivator blade 580 is attached to the distal end of the cultivator arm 586, which is attached to the support bracket 589. Also shown are sections of the support beam arrangement 588.

Figure 12D:
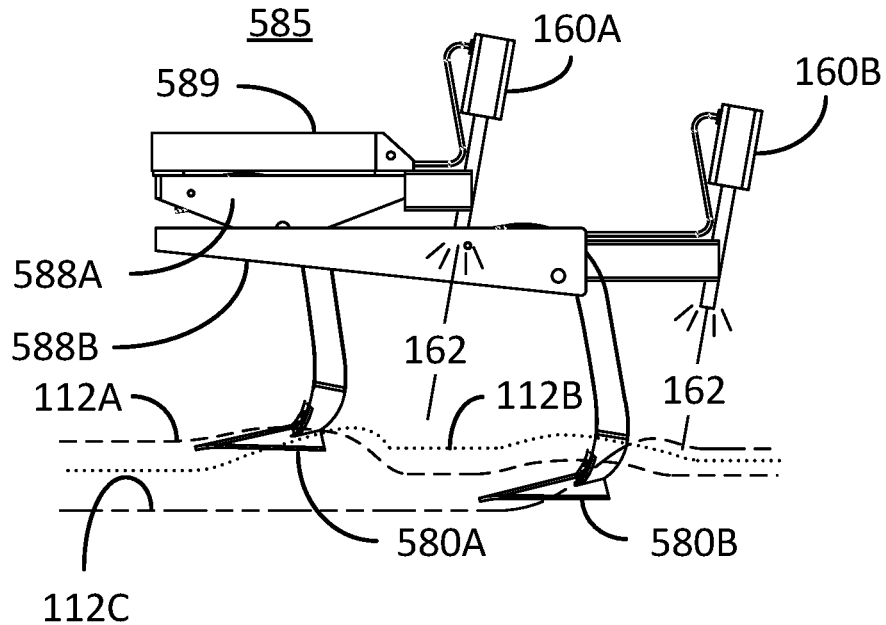
FIGS. 12D and 12E illustratively depict a double row spike cultivator blade arrangement consistent with embodiments of the present invention.
Figure 12E:
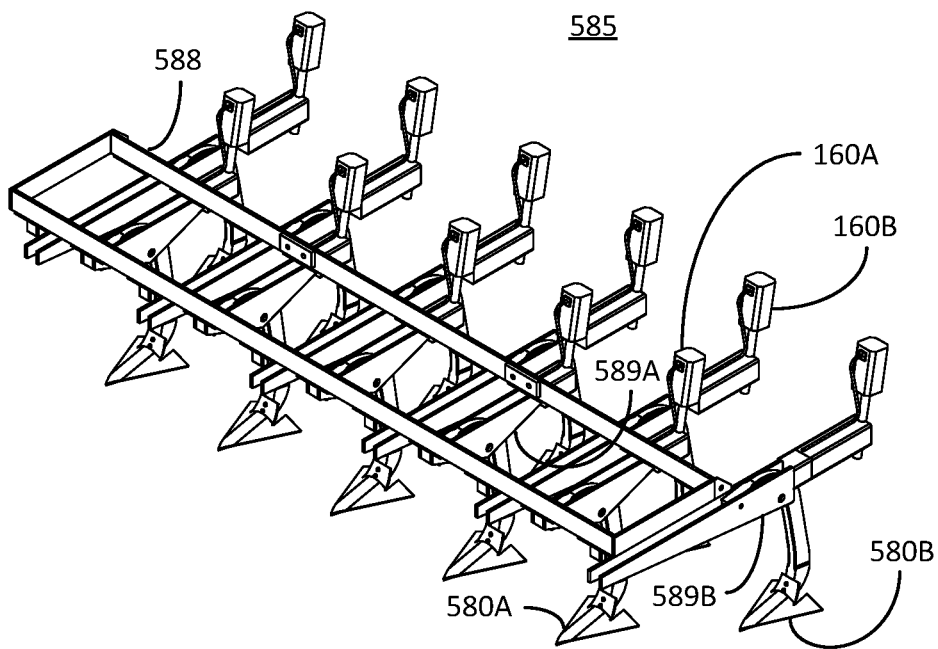

FIGS. 12D and 12E illustratively depict a double row spike cultivator blade arrangement 585 consistent with embodiments of the present invention. FIG. 12D is a side view line drawing of the double row spike cultivator blade arrangement 585 where a first spike cultivator blade row 580A is in front of and above a second spike cultivator blade row 580B. Accordingly, as the double row spike cultivator blade arrangement 585 moves in the direction of the arrow 516, the first spike cultivator blade row 580A turns over an upper layer of regolith 112A, wherein the first row of lasers 160A corresponding to the first spike cultivator blade row 580A heats the middle layer of regolith 112B via their respective laser beams 162 to liberate gaseous material trapped 115 in the middle layer of regolith 112B. The second spike cultivator blade row 580B turns over a lower layer of regolith 112C, wherein the second row of lasers 160B corresponding to the second spike cultivator blade row 580B, heats the lower layer of regolith 112C to liberate gaseous material 115 trapped therein. The first spike cultivator blade row 580A and second spike cultivator blade row 580B are connected support beams 588A and 588B, respectively, which is connected to the connector bracket 589.

FIG. 12E is an isometric view line drawing of the double row spike cultivator blade arrangement 585 showing the relative position of the first spike cultivator blade row 580A in front of and above the second spike cultivator blade row 580B as well as the corresponding lasers 160A and 160B. The support beam 578 and the connector bracket 579 are also shown here for reference.

Figure 13A:
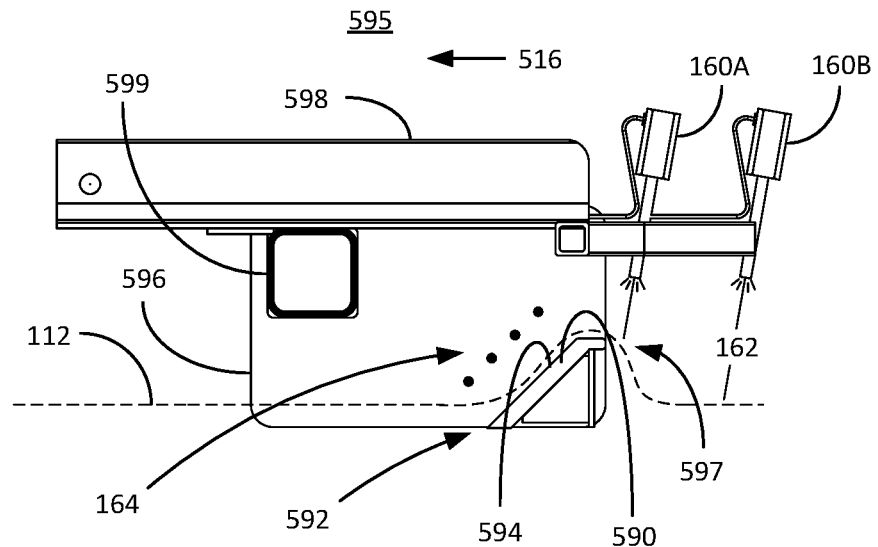
FIGS. 13A-13C are line drawings of embodiments of another regolith harvesting embodiment depicting a box blade consistent with embodiments of the present invention.
Figure 13B:
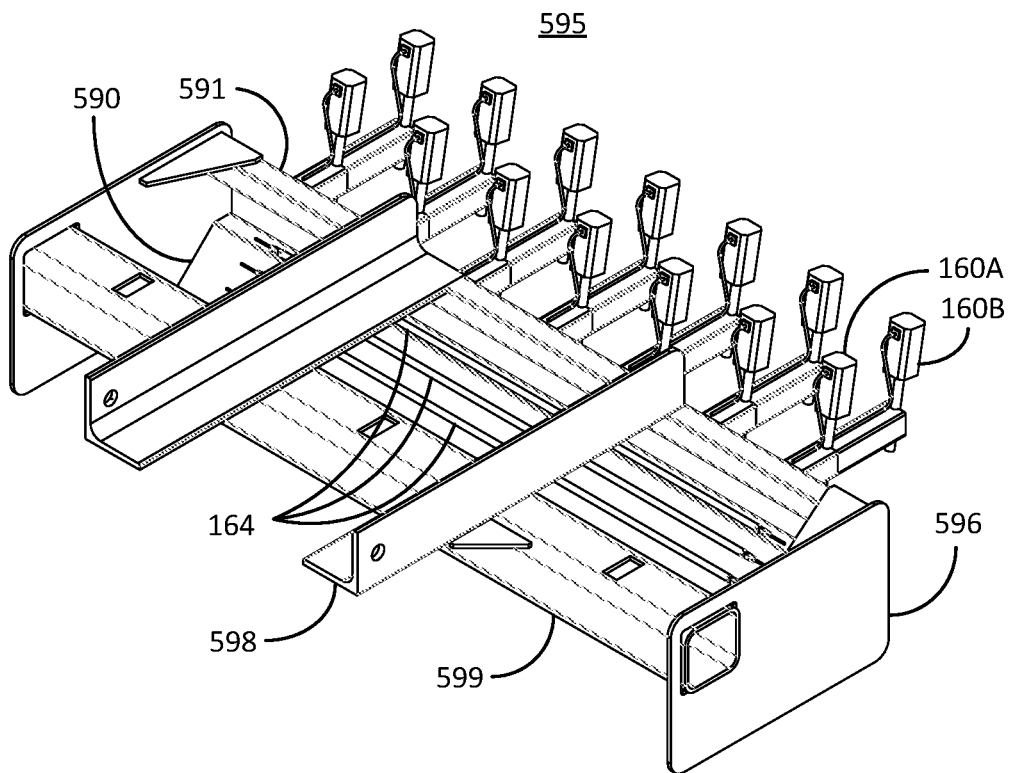
Figure 13C:
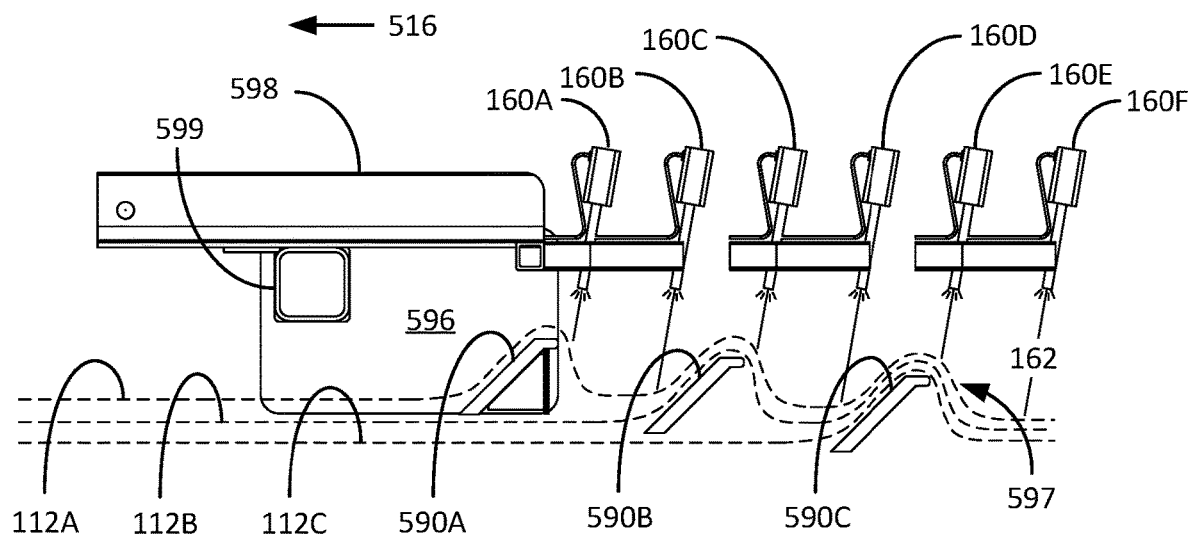

FIGS. 13A-13C are line drawings of embodiments of another regolith harvesting embodiment depicting a box blade consistent with embodiments of the present invention. With reference to FIGS. 13A and 13B shown therein is a single box blade arrangement 595 having a box blade 590 that extends between two side walls 596. The two side walls 596 are confined in place by a front support beam 599 and a back support beam 591, as well as the box blade 590. The box blade arrangement 595 attaches to a cover 534 via support brackets 598. In this embodiment, the box blade arrangement 595 moves in a forward direction 516, shown by the arrow, by way of a rover 520, for example. As the box blade arrangement 595 moves forward 516, the box blade tip 592 digs into the top layer of regolith 112, which pushes over the box blade face 594 and waterfalls over the box blade trailing edge 597. In this embodiment, there are radiant heaters 164 that heat the regolith 112 in front of the box blade 590, the box blade face 594 can also be heated (such as by resistors embedded in or attached to the box blade 590). A pair of lasers 160A and 160B can further heat the regolith 112 as it waterfalls off the trailing edge 597 and when the regolith 112 settles behind the box blade 590. It should be appreciated that in optional embodiments, any one of the heating methodologies can be included or absent from the box blade arrangement 595 without departing from the scope and spirit of the present invention. As shown, FIG. 13A is a side view line drawing of the single box blade arrangement 595 and FIG. 13B is an isometric line drawing of the single box blade arrangement 595.

FIG. 13C is a side view line drawing of another box blade embodiment 193 with multiple box blades 590A-590C arranged in successive depths to penetrate the regolith 112 at those successive depths. As shown, the first box blade 590A penetrates the upper layer of regolith 112A, the second box blade 590B penetrates a deeper layer of regolith 112B, and the third box blade 590C penetrates yet an even deeper layer of regolith 112C, all of which serves to mine target gaseous material 115 in successive layers of the regolith 112 when the box blade arrangement 193 moves in the forward direction 516. In this embodiment, there is a front laser 160A and 106C and 160E to every box blade 590 to liberate the regolith 112 is it waterfalls off the respective box blade trailing edges 597. There is also a rear laser 160B, 160D and 160E configured to liberate target gaseous material 115 from the settled regolith 112 behind each of the respective box blade trailing edges 597. More specifically, there is a first laser 160A and second laser 160B behind the first box blade 590A, a third laser 160C and fourth laser 160D behind the second box blade 590B, and yet a firth laser 160E and a sixth laser 160F behind the third box blade 590C. For reference, the body of the box blade arrangement 593 is shown depicting a sidewall 596, a front support beam 599 and a support bracket 598, as described in more detail in connection with FIGS. 13A and 13B.

FIGS. 14A-14C are line drawings of a single disk harrow embodiment consistent with embodiments of the present invention. FIG. 14A shows the side view of the single disk harrow arrangement 605 prominently depicting a disk harrow 600 embedded in regolith 112. The disk harrow 600 comprises a plurality of teeth 602 distributed along the disk outer diameter 601. As the disk harrow arrangement 605 moves in the forward direction 516, the disk harrow teeth 602 rotate or otherwise turn over the bottom layer of regolith 112B relative to the top layer of regolith 112A. In other words, the regolith bottom layer 112B is turned over the regolith top player 112A at the disk harrow trailing side 607. The disk harrow 600 spins about a hub 604 that is connected to a support beam 608. The single disk harrow arrangement 605 is a passive arrangement that moves through the regolith 112 as the rover 520 moves. In other words, the disk harrow 600 rotates with the speed of the rover 520. In this embodiment, there is a front radiant heating element 164A that heats the regolith 112 in front of the harrow disk 600 and a rear radiant heating element 164B that heats the regolith 112 behind the harrow disk 600. A laser heating element 160 is arranged to sweep a laser beam 162 on the regolith 112 (to heat the regolith 112). Heat from the heating elements 164A, 164B and 160 heat various areas of the regolith 112, which liberates target gases 115 from the regolith 112.

FIG. 14B is a front view of the single disk harrow arrangement 605 depicting the harrow disk 600 mounted to the hub 604. The hub 604 is connected to the support beam 608 via a connecting arm 606. The front heating element 164A and the laser 160 are shown here for reference.

FIG. 14C is a front isometric view of the single disk harrow arrangement 605 showing the relationship of the disk 600 and disk teeth 602 relative to the front and rear heating elements 164A and 164B, the laser 160 and the support beam 608 and connecting arm 606.

Figure 14D:
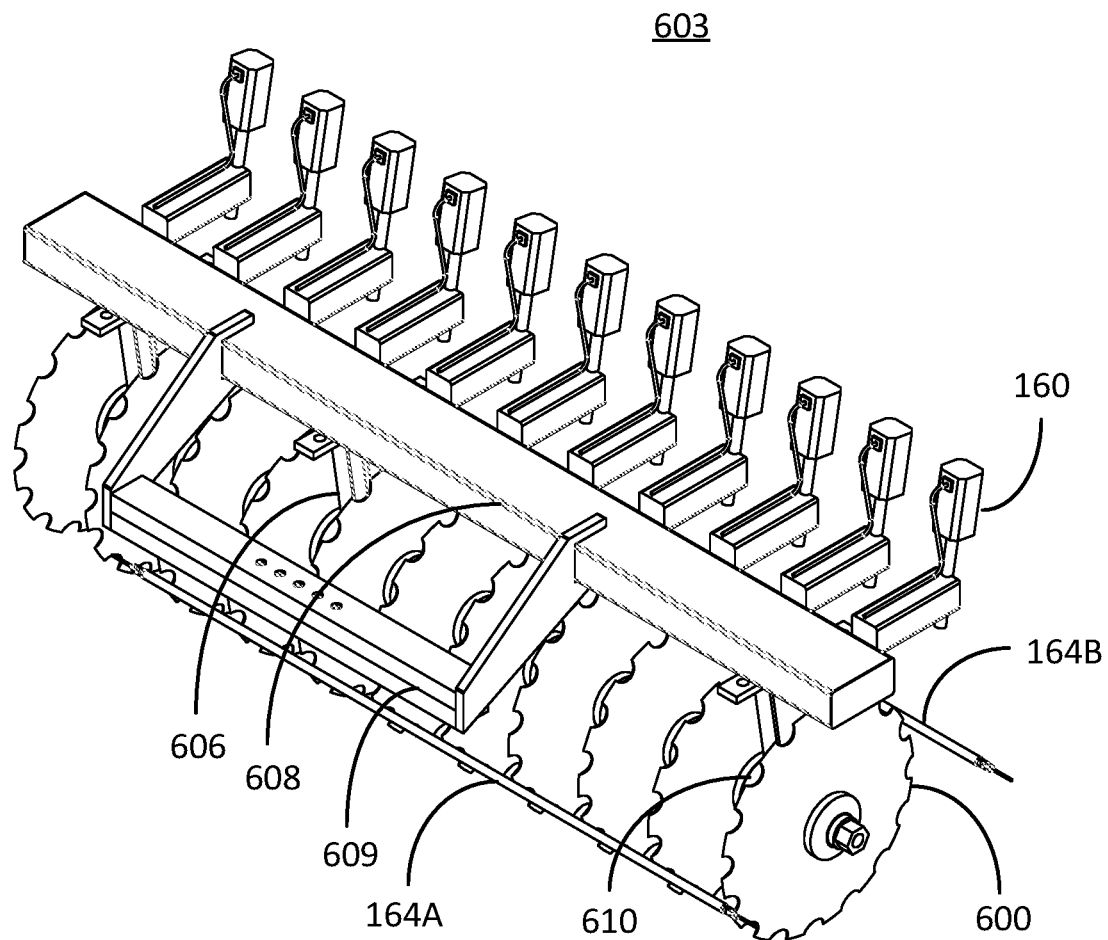
FIG. 14D is a line drawing of a single row of disk harrows consistent with embodiments of the present invention.

FIG. 14D is a line drawing of a single row of disk harrows 600 consistent with embodiments of the present invention. The single disk harrow row arrangement 603 is a passive arrangement that illustratively depicts the front radiant heating element 164A in front of the single row of disk harrows 600 and the rear radiant heating element 164B behind the single row of disk harrow 600. In this embodiment, a plurality of lasers 160 are mounted to the support beam 608 behind the disk harrows 600, wherein there is a laser 160 that corresponds to each of the disk harrows 600. It should be appreciated that though there are plurality of lasers 160 in this embodiment, other embodiments envision fewer lasers or even a single laser mounted behind the support beam 608 or elsewhere within the cover 534 so long as the laser beam 162 can provide localized heat to the regolith 112. The single row of disk harrows 600 are connected to and rotate about a central shaft 610 that is connected to the support beam 608 via a plurality of connecting arms 606. The single disk harrow row arrangement 603 connects to the cover 534 via a support bracket 609.

Figure 14E:
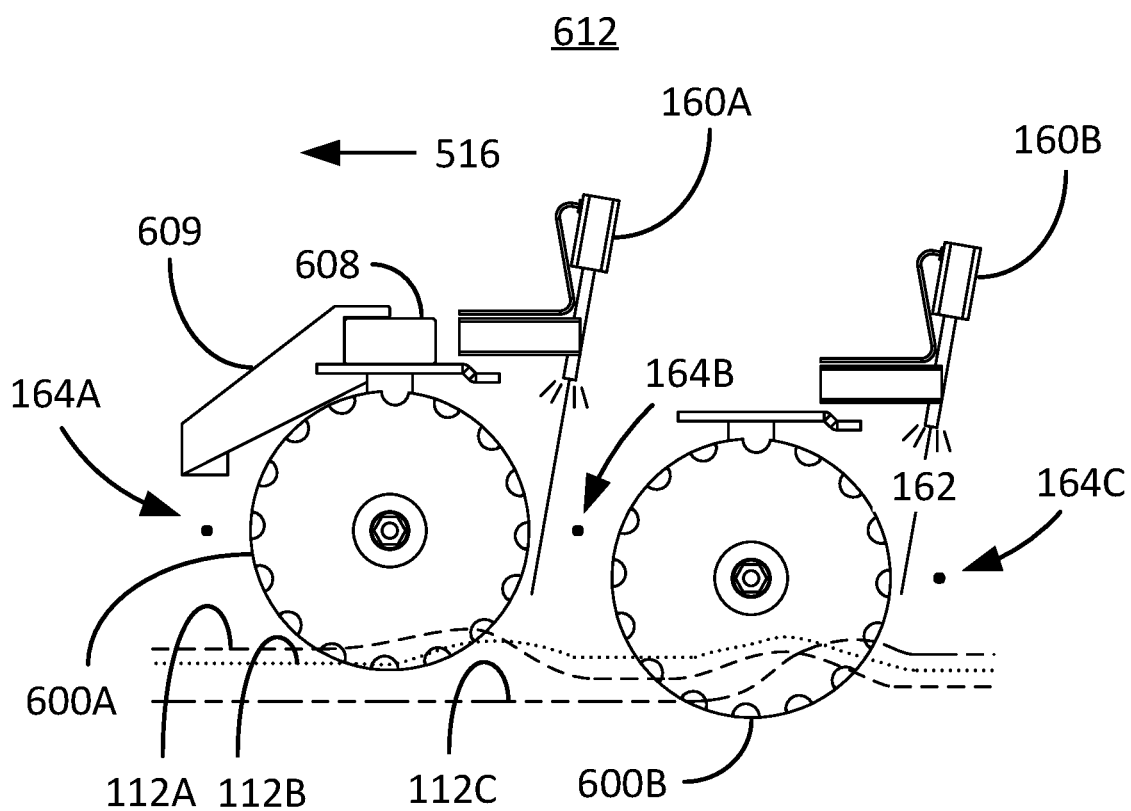
FIG. 14E is a diagrammatic illustration of a double disk harrow arrangement consistent with embodiments of the present invention.

FIG. 14E is a diagrammatic illustration of a double disk harrow arrangement 612 consistent with embodiments of the present invention. As shown, a first disk harrow row 600A is in front of and above a second disk harrow row 600B, wherein the second disk harrow row 600B is disposed deeper in the regolith 112 than the first disk harrow row 600A. In this way, as the double disk harrow row arrangement 612 moves through the regolith 112, in the direction of the arrow 516, a middle regolith layer 112B is rotated on top of an upper regolith layer 112A behind the first harrow row 600A and a lower regolith layer 112C is rotated on top of the middle regolith layer 112B behind the second harrow row 600B. The regolith 112A, 112B and 112C layers are heated by radian heaters 164A, 164B and 164C, in front and behind the disk harrow rows 600A and 600B in addition to laser beams 162 from lasers 160A and 160B behind the respective disk harrow rows 600A and 600B. The support beam 608 and support bracket 609 are shown here for reference. The double disk harrow arrangement 612 is a passive arrangement embodiment.

Figure 14F:
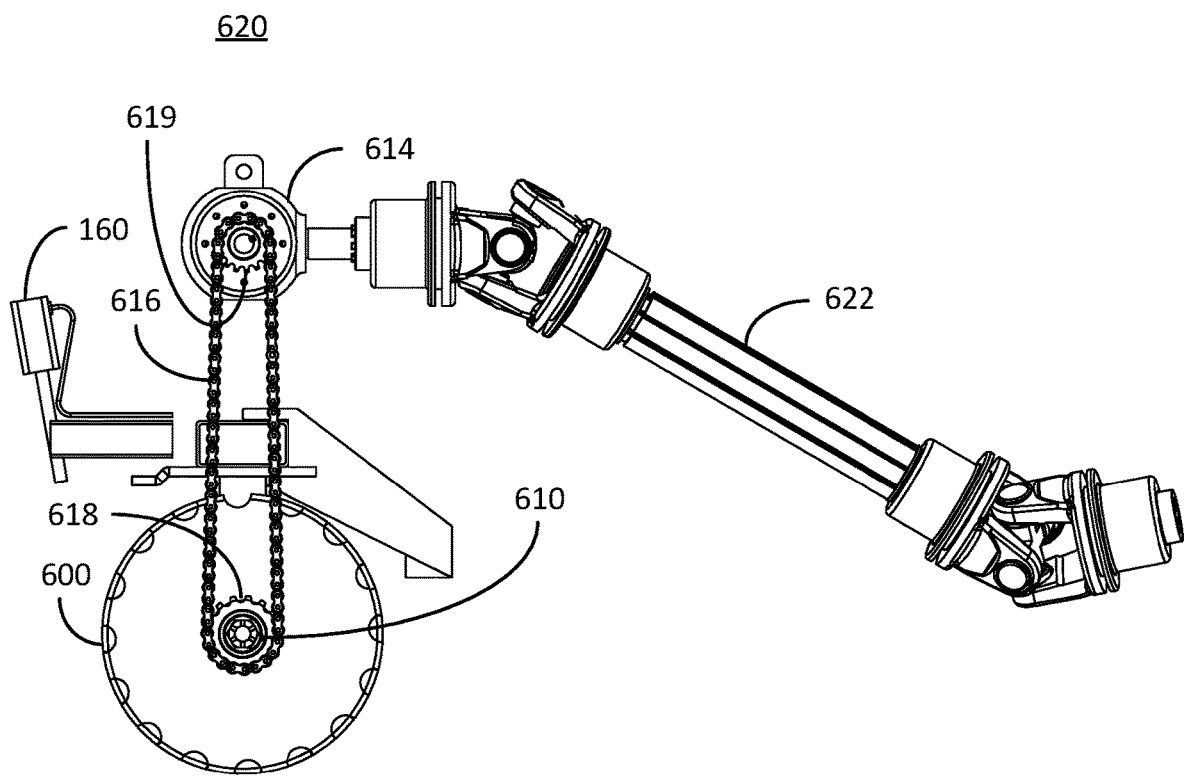
FIGS. 14F and 14G are line drawings of an active single row disk harrow arrangement consistent with embodiments of the present invention.
Figure 14G:
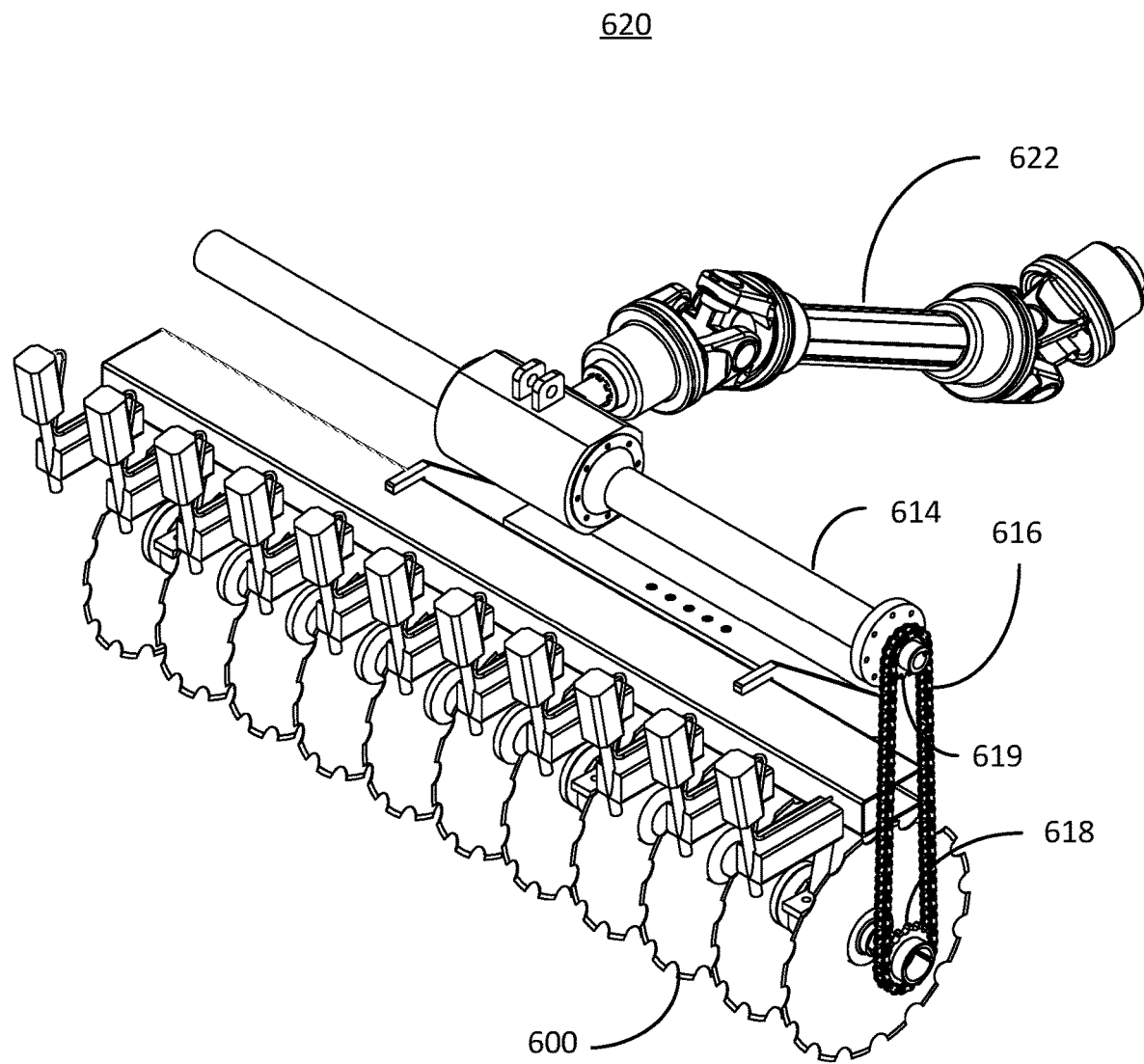

Optional embodiments envision the disk harrow row arrangements being actively driven disk harrows as shown in FIGS. 14F and 14G. FIGS. 14F and 14G are line drawings of an active single row disk harrow arrangement 620 consistent with embodiments of the present invention. FIG. 14F illustratively depicts a linkage arm 622 that is driven by a motor (not shown) which spins a driveshaft 614 that intern rotates a chain 616 that drives the disk harrow 600. More specifically, a chain 616 that is connected to a driveshaft sprocket 619, which spins with the driveshaft 614, drives the disk harrow 600 via a disk harrow sprocket 618, which is connected to the central shaft 610. The laser 160 is shown herein located behind the disk harrow 600. The active single row disk harrow arrangement 620 can spin the disk harrow 600 are a different speed than the passive arrangements discussed above.

FIG. 14G is an isometric view of the active single row disk harrow arrangement 620 showing the relationship of the linkage arm that spins the driveshaft 614, which drives the single row disk harrows 600 via the chain 616 and sprockets 618 and 619.

Figure 15A:
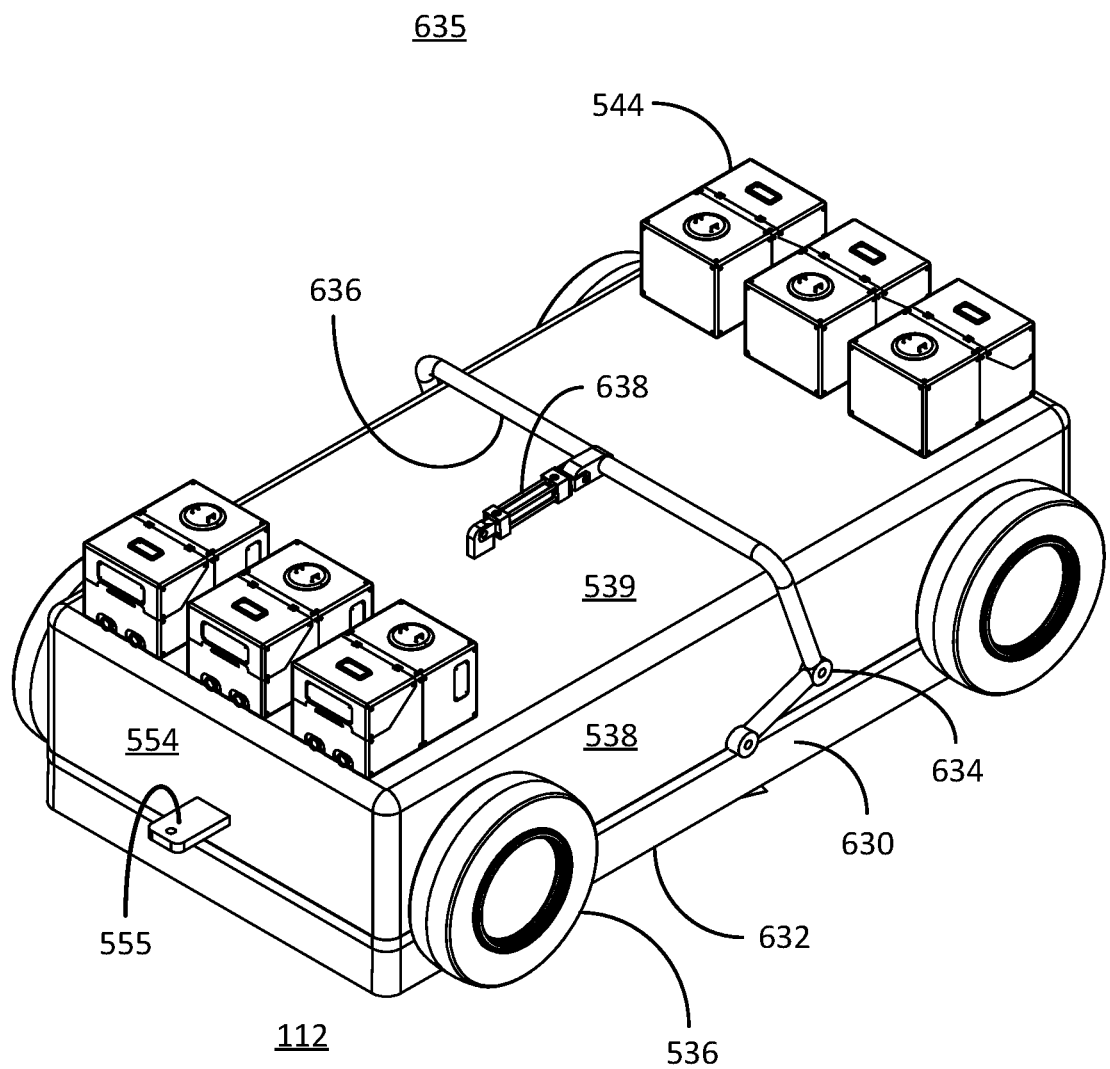
FIGS. 15A-15C depict a shielded environment embodiment of a skirt that is configured to extend and retract from a cover body to engage the surface of regolith.

FIGS. 15A-18B depict various embodiments of shielded environments consistent with embodiments of the present invention. FIGS. 15A-15C depict one such shielded environment embodiment of a skirt 630 that is configured to extend and retract from a cover body 538 to engage the surface of regolith 112. This embodiment is especially good for mining an area that has a footprint the size of the perimeter of the skirt rim 632 in a manner that uses a stop and start mining method. The stop and start mining method is when an area the size of the footprint is mined following another area the size of the footprint is mined (likely a sequential footprint). This is in contrast to continuously mining regolith 112 under a cover as the rover 520 moves forward, referred to herein as continuous mining. With continued reference to the stop and start mining method, during actively mining target gasses 115, the skirt rim 632 is retracted while moving forward 516 over the regolith surface 112 and then stops to extend the skirt rim 632 to the regolith surface to commence mining target gasses 115 from the regolith 112.

Figure 15B:
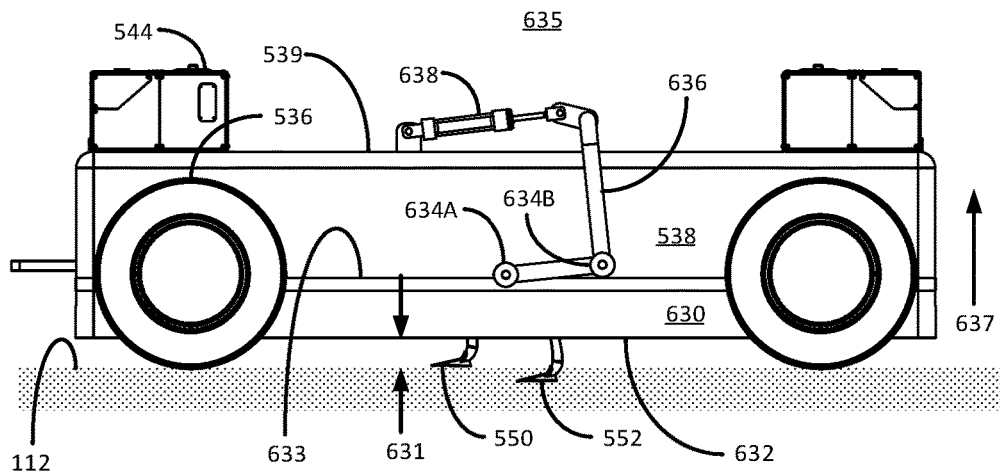

FIG. 15A is a front isometric view of the cover and retractable skirt embodiment 635 (which is beneficial for stop and start mining) with the retractable skirt 634 in a retracted orientation, as shown by the arrow 637 in FIG. 15B. While in the retracted orientation 637, the skirt 634 is pulled away from the regolith 112 (and partway over the cover body 538) via the linkage 636/634 that is driven by a hydraulic cylinder 638. When retracted, there is clearance between the skirt rim 632 and the regolith 112, which enables the wheels 536 to freely roll without the skirt 630 scraping on the regolith 112. Though six batteries 544 are depicted disposed on the cover top 539. Other configurations envision batteries located elsewhere or even a different power source such as nuclear or solar. An attachment arm 555 is depicted extending from the front 554 of the retractable skirt embodiment 635 to hook up to a rover 520 or a plow 522 (shown in FIG. 10B, for example).

FIG. 15B is a side view line drawing of the retractable skirt embodiment 635 with the skirt 630 retracted 637, which provides clearance for the wheels 536 to roll over the regolith 112 without the skirt rim 632 contacting or otherwise scraping against the regolith 112. That is, the skirt rim 632 is displaced 631 a certain distance away from the surface of the regolith 112, such as between 2-10 inches, for example. Also, with the skirt 630 retracted 637, the front and rear regolith moving blades 550 and 552 can plow through the regolith 112, as previously discussed. As further depicted, the skirt 630 is held in the retracted position 637 by way of the linkage 636 articulated about the linkage joints 634A and 634B via the extended hydraulic cylinder 638. The skirt linkage joint 634A is attached to the skirt upper lip 633 and the cover body linkage joint 634B is attached to the cover body 538. The skirt linkage joint 634A and the cover body linkage joint 634B are pivot points. The hydraulic cylinder 638 is attached to the cover top 539 along with the batteries 544. As should be appreciated, other kinds of linkages or ways to raise and lower the skirt 630 can be employed by those skilled in the art without departing from the scope and spirit of the present invention.

Figure 15C:
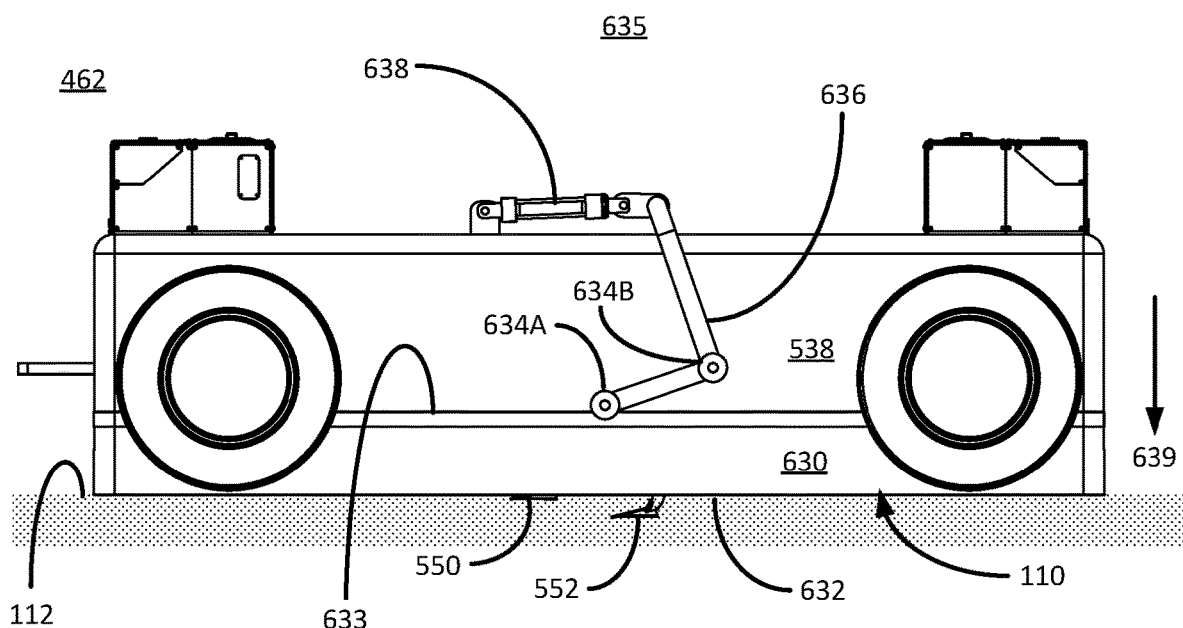

FIG. 15C is a side view line drawing of the retractable skirt embodiment 635 with the skirt 630 lowered 639 or otherwise extended on the surface of the regolith 112. This creates an interior environment 110 defined by the volume within the skirt 630 and cover body 538 that is further bounded by the regolith surface 112. With the skirt rim 632 resting atop the regolith 112, the gas collection system, such as gas collection system 100 for example, can more efficiently collect the liberated target gasses 115, which are shielded from escaping into the external environment 462. As depicted, the skirt 630 is deployed in the extended position 639 by way of the linkage 636 articulated about the linkage joints 634A and 634B via the retracted hydraulic cylinder 638.

Figure 16A:
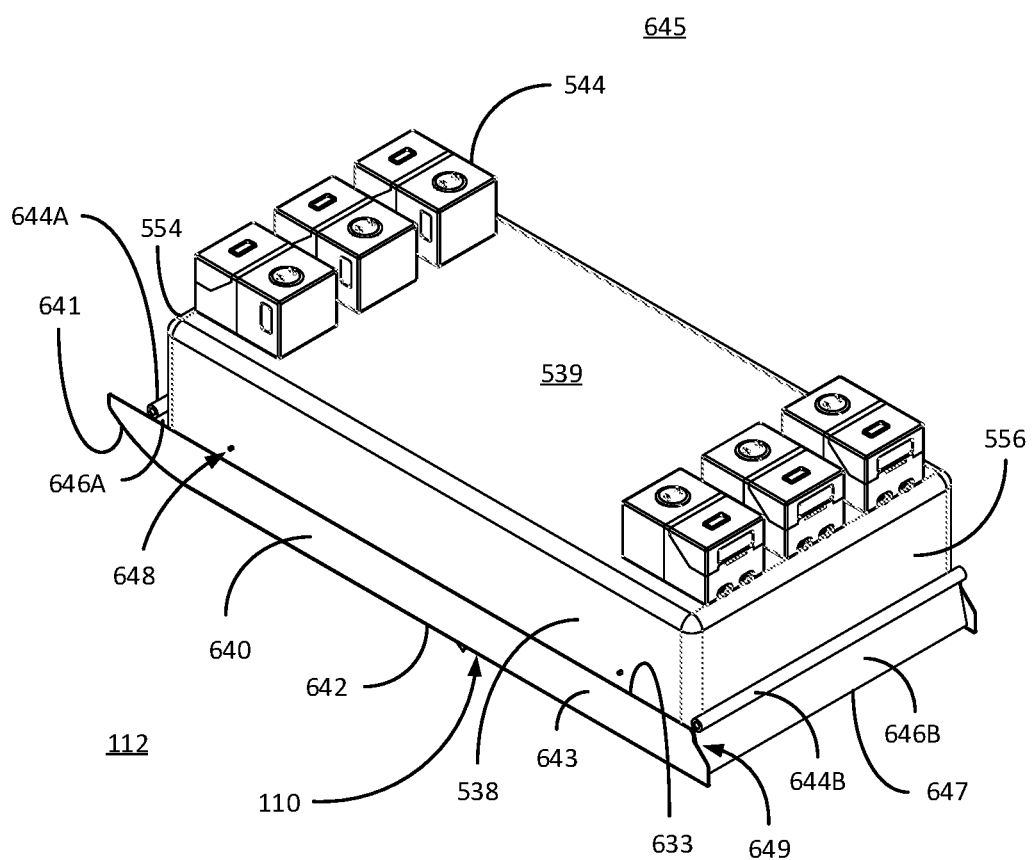
FIGS. 16A-16D are line drawings of a cover and bladed skirt embodiment consistent with embodiments of the present invention.

FIG. 16A is a rear isometric line drawing of a cover and bladed skirt embodiment 645, which is useful for either stop and start mining or continuous mining, consistent with embodiments of the present invention. This embodiment can be a secondary mobile gas collection arrangement that is pulled behind a rover 520, such as in FIG. 10D. Optionally, the cover and bladed skirt embodiment 645 can comprise wheels (where the wheel position is 648) and a drive system as part of a self-propelling rover arrangement. In other words, the cover and bladed skirt embodiment 645 can be the main body of another rover that drags the sled rail edges 642 over the regolith 112 as the wheels rotate. As shown, the cover and bladed skirt embodiment 645 comprises batteries 544 that are disposed on the cover top 539. The bladed skirt 640 extends approximately from the skirt upper lip 633 (within a couple of inches for example) to the sled rail edges 642 and flap distal edges 647. The sled rail edges 642 are the distal edges of the side rails 643, which are configured to dig into the surface of the regolith 112. The interior environment 110 is bounded by the cover body 538, side rails 643, front and back hinged flap 646A and 646B, and regolith 112. The hinged flaps 646A and 646B are attached to the front and back cover surfaces 554 and 556 via hinges 644A and 644B, respectively. The hinged flaps 646A and 646B are envisioned to rest against the regolith 112 at the front and the back as the cover and bladed skirt embodiment 645 traverses across the regolith 112. Certain embodiments envision the hinged flaps 646A and 646B having a spring or other biasing element that forces the flap distal edges 647 against the regolith 112. Some embodiments envision a seal (not shown) at the interface 649 between the side rails 643 and the flaps 646 to better seal the interior environment 110.

Figure 16B:
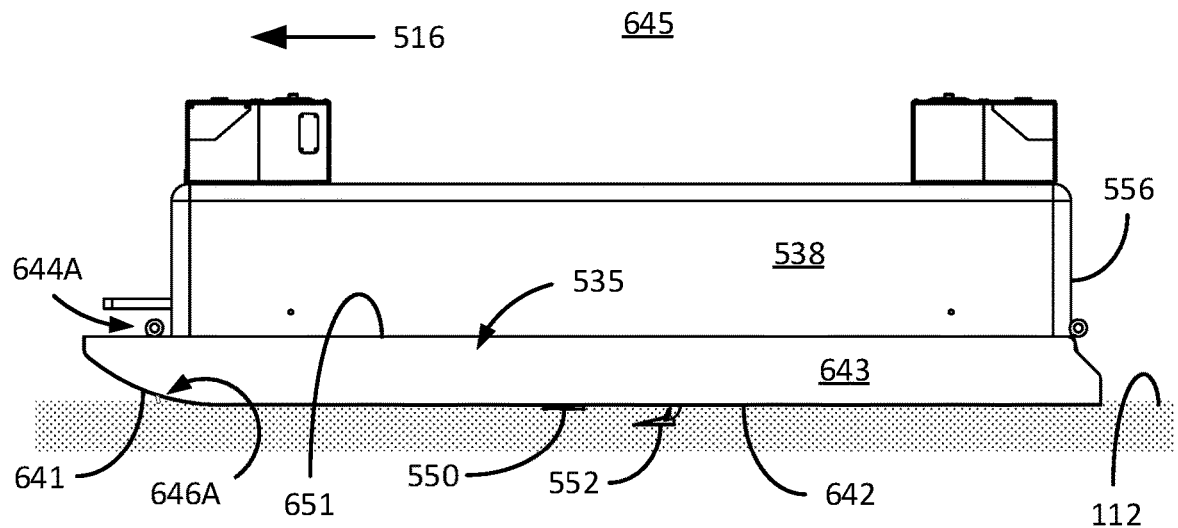

FIG. 16B is a side view line drawing of the cover and bladed skirt embodiment 645. As shown, the sled rail edges 642 are slightly embedded in the surface of the regolith 112, for example 2 cm in the regolith 112 (from the surface of the regolith 112). Other embodiments envision the sled rail edges 642 simply being in contact with the surface of the regolith 112. As the cover and bladed skirt embodiment 645 moves forward in the direction of the arrow 516, the rail leading edge ramp 641 slides over the regolith 112 (resembling a sled rail) pushing the front hinged flap 646A (which rotates about the front hinge 644A) towards the rear 556, as shown. Though not shown here, likewise, the rear hinged flap 646B is also pushed in the direction opposite the arrow 516. As should be appreciated here, the side rails 643 are fixed to the cover body 538 approximately at the rail upper lip 651, which is also essentially located at the cover body rim 535 or within 3 inches of the cover body rim 535. Other embodiments envision the side rails 643 being integrated and even unitary (part of) with the cover body 538.

Figure 16C:
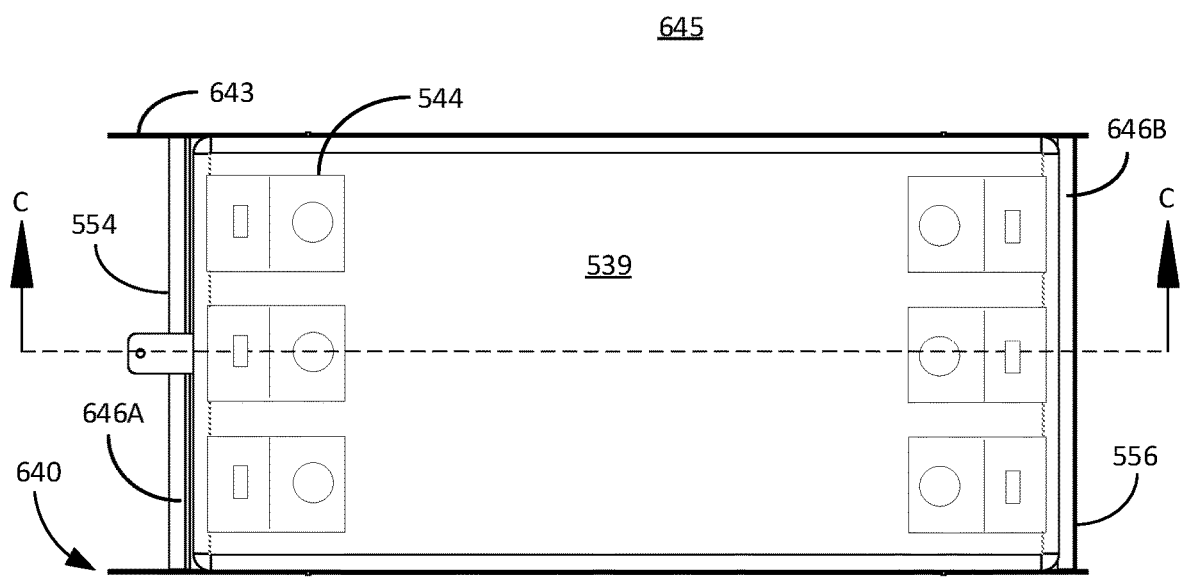

FIG. 16C is a top view of the cover and bladed skirt embodiment 645 showing a cross-section cut-line C-C that goes through the center of the cover top 539 bisecting the front 554 and back 556. As further shown, the two side rails 643 are sealed against the front hinged flap 646A and the back hinged flap 646B. The batteries 544 are labeled for reference.

Figure 16D:
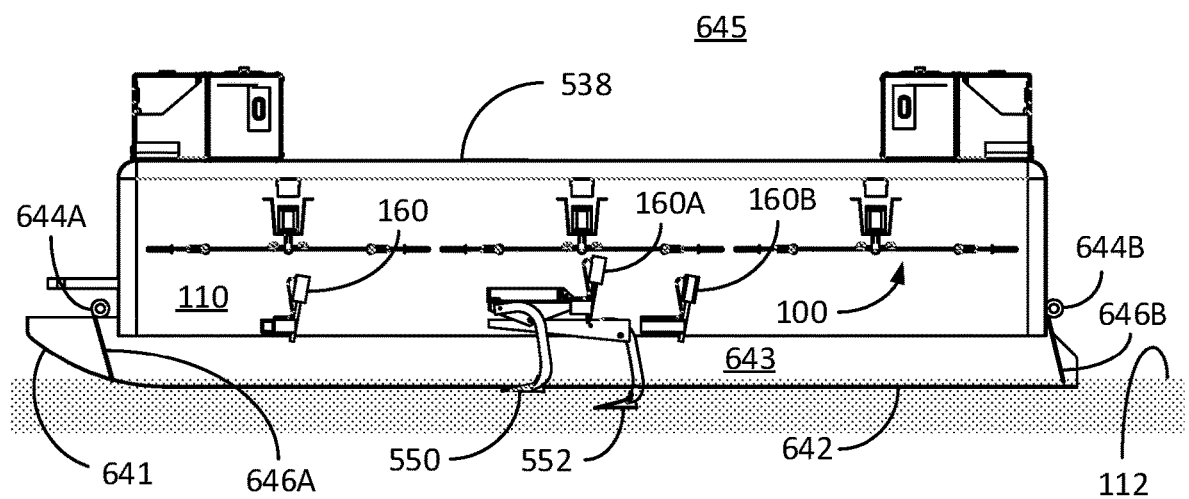

FIG. 16D is a cross-section side view line drawing of the cover and bladed skirt embodiment 645 along cut-line C-C. The cross-section depicts a vapor collection system embodiment 100 inside the interior environment 110. As described in previous embodiments, at least one heat source 160 is disposed in the interior environment 110 to heat the regolith 112 to release target gaseous material 115. The front and rear regolith moving blades 550 and 552 are depicted by way of example along with corresponding laser heaters 160A and 160B. The sled rail edge 642 is slightly embedded in the surface of the regolith 112 with the leading-edge ramp 641 extending from the regolith 112, as shown. The front and back hinged flaps 646A and 646B are angled but resting on the regolith surface 112. The front and back hinges 644A and 644B are shown herein for reference. The interior environment 110 is defined in this embodiment as the volume that is bounded between the regolith surface 112 and the interior surfaces of the front and back hinges 644A and 644B, the front and back hinged flaps 646A and 646B, and the cover body 538.

Figure 17A:
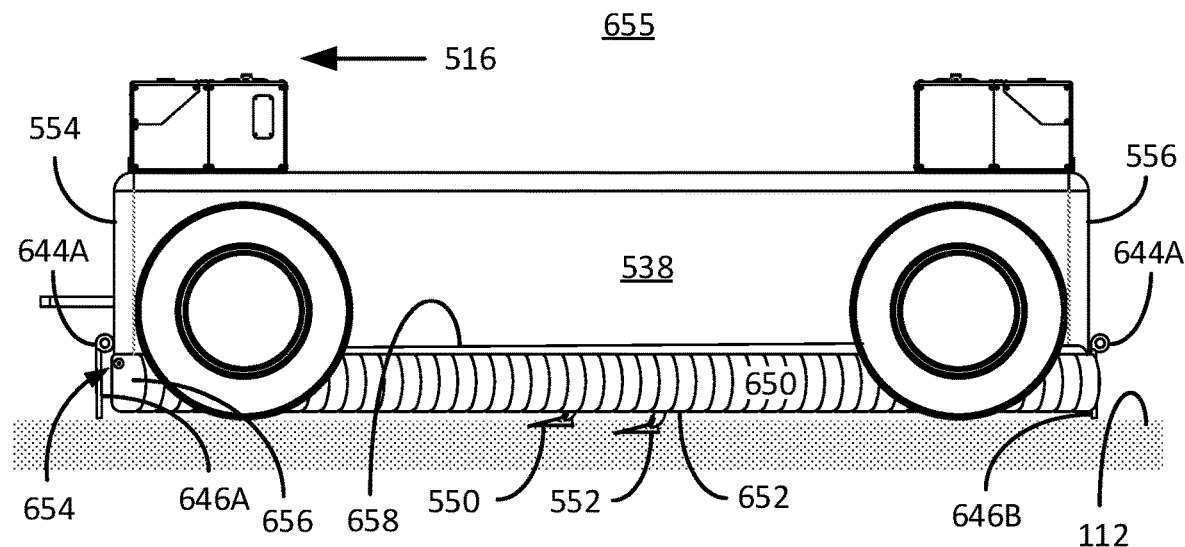
FIGS. 17A-17B are line drawings of a cover and compliant skirt embodiment consistent with embodiments of the present invention.

FIG. 17A is a side view line drawing of a cover and compliant skirt embodiment 655, which is useful for either stop and start mining or continuous mining, consistent with embodiments of the present invention. As shown, the cover and compliant skirt embodiment 655 comprises a compliant plated skirt 650 that in this depiction is not in contact with the surface of the regolith 112, i.e., there is a small amount of space between the skirt distal edge 652 and the regolith 112. The compliant plated skirt 650 comprises a plurality of rotatable plates 656 that are each attached to a skirt substrate 658 via a corresponding plate pivot pin 654 (or some other suitable pivot mechanism). As with the cover and bladed skirt embodiment 645 of FIG. 16A-16D, there are front and back hinged flaps 646A and 646B connected to the cover front 554 and cover back 556 (or optionally at a skirt substrate front and back), respectively, which make up the front and back sides of the compliant plated skirt 650. The front and back hinged flaps 646A and 646B contribute with the compliant plate skirt 650 to maintain an interior environment 110 (shown in FIG. 17B). The hinged flaps 646A and 646B rotate about flap hinges 644A and 644B. The front and rear regolith moving blades 550 and 552 are shown for reference extending from the compliant plated skirt 650 and more specifically from the skirt distal edge 652. The direction of travel of the cover and compliant skirt embodiment 655 is shown by the arrow 516.

Figure 17B:
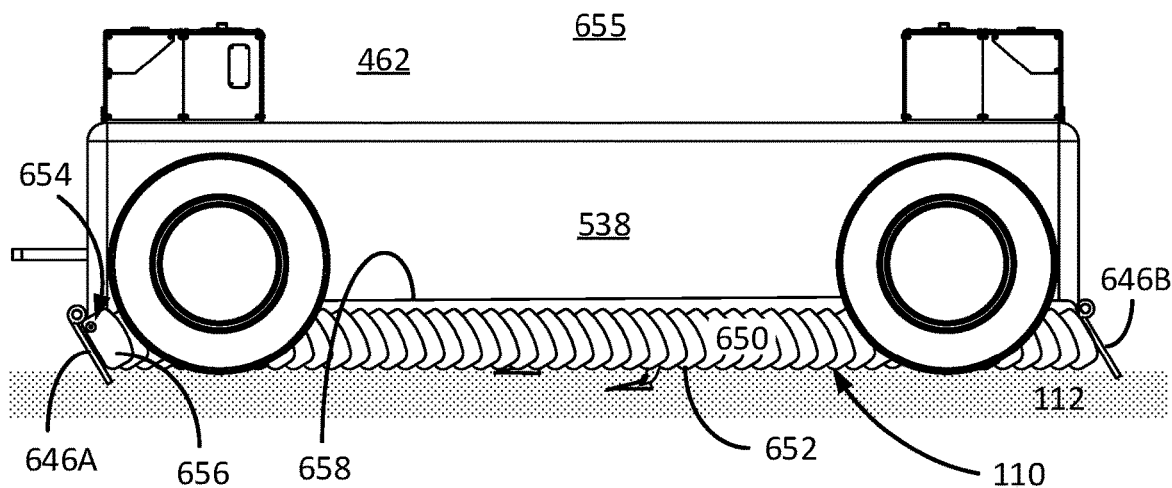

FIG. 17B is a side view line drawing of the cover and compliant skirt embodiment 655 in contact with the surface of the regolith 112. As shown, the individual plates 656 of the compliant skirt 650 and hinged flaps 646A and 646B are pivoted to accommodate embodiment the regolith 112 moving under the compliant skirt embodiment 655. It should be appreciated that each individual plate 656 may be tilted at a different angle depending on the topography (flatness) of the regolith 112. Certain other embodiments envision the skirt distal edge 652 digging into the regolith 112 to better close off the interior environment 110 from the exterior environment 462.

Figure 18A:
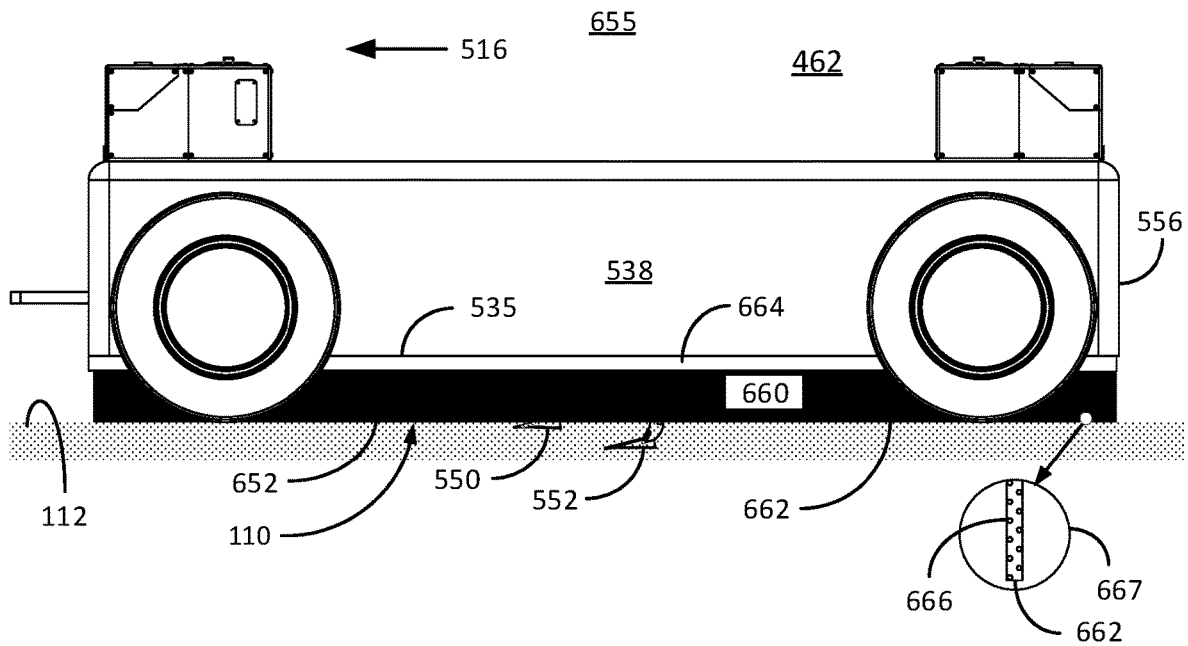
FIGS. 18A-18B are line drawings of an optional cover and compliant skirt embodiment consistent with embodiments of the present invention.

FIG. 18A is a side view line drawing of yet another cover and compliant skirt embodiment 665, which is useful for either stop and start mining or continuous mining, consistent with embodiments of the present invention. As shown, the cover and compliant skirt embodiment 665 comprises a compliant brush skirt 660 that extends from the rim 535 of the cover body 538. This brush skirt embodiment 660 comprises a plurality of bristles 666 that are attached to a cuff 664 that wraps around or extends along the inside of the perimeter of the rim 535, however other embodiments contemplate the bristles 666 simply extending from the rim 535. One bristle 666 is depicted in a magnified circle 667 near the rear 556 of the cover and compliant skirt embodiment 665. The distal bristle ends 662 (also considered to be the brush rim/skirt distal edge 662) are in contact with the surface of the regolith 112 around the perimeter of the cuff 664 to maintain a closed interior environment 110. The front and rear regolith moving blades 550 and 552 are shown for reference extending from the compliant brush skirt 660 and more specifically from the skirt distal edge 662. The direction of travel of the cover and compliant skirt embodiment 665 is shown by the arrow 516. As the cover and compliant skirt embodiment 665 moves in the direction of travel 516, the bristles 666 bend and comply with the surface of the regolith 112 to maintain the closed interior environment 110.

Figure 18B:
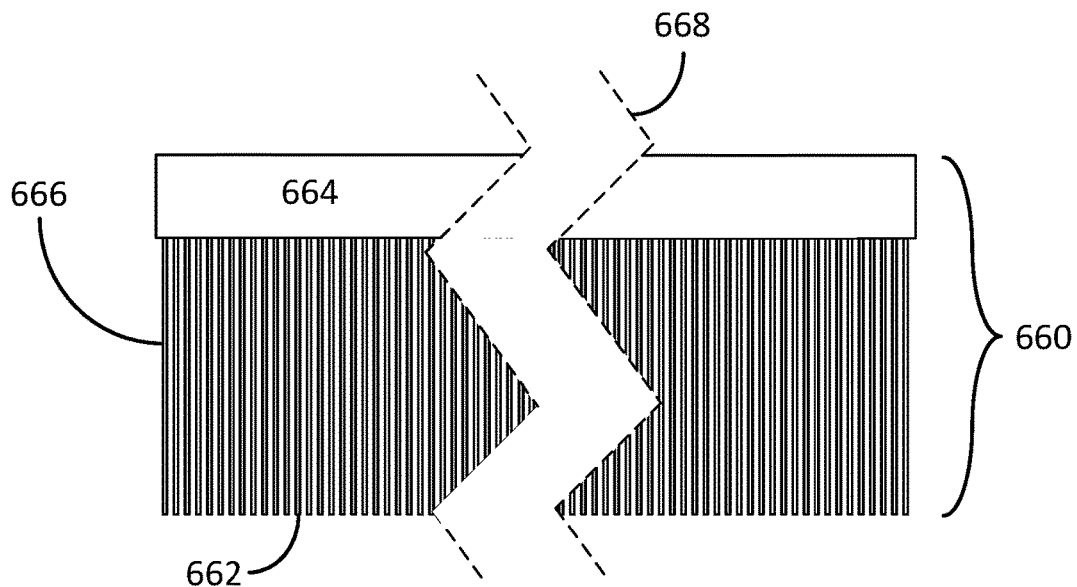

FIG. 18B is a closeup line drawing depicting a compressed brush skirt embodiment 660, shortened by the dashed section cut 668. As shown, the bristles 666 extend from the cuff 664 to the distal bristle ends 662. Though the individual bristles 666 are depicted in this figure, it is envisioned that the bristles 666 overlap to better form the closed interior environment 110. Some embodiments envision a brush thickness defined by the depth of the brush 660 extending from the exterior environment 462 towards the interior environment 110. Some embodiments contemplate the brush thickness being between 0.25-0.75 inches, however other brush thicknesses are envisioned without departing from the scope and spirit of the present invention.

The aforementioned skirt embodiments are simply some of the species of skirt embodiments contemplated as should be appreciated by a skilled artisan. For example, other kinds of compliant skirts that can accommodate the regolith surface can be employed without departing from the concepts presented herein. For example, a variety of interlocking plates or sections can be used as well as compliant materials, such as fabrics. The intention is to provide a closed internal environment 110 that is shielded from the outside 462.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention contemplate a mining arrangement 635 comprising a cover 534 that has a rigid cover body 538 extending in a first direction from a cover rim 535 to a cover top/apex 539 and a skirt 630 extending in a second direction from the cover rim 535 to a skirt rim 632, wherein the second direction is opposite the first direction. The cover 534 and the skirt 630 define a shielded environment 110 when the skirt rim 632 rests atop granular soil (on the surface of), such as regolith 112. The shielded environment 110 is essentially not in communication with an outside environment 462 via the cover body 538 and skirt 630. A heat source 160 is disposed in the shielded environment 100, wherein the heat source 160 configured to heat the granular soil 112. A gas collection surface 105 is disposed in the shielded environment 110, wherein the gas collection surface 105 is configured to maintain a temperature below 100° Kelvin to collect the target gasses 115 floating inside of the shielded environment 110. Though the embodiment described is to the cover retractable skirt embodiment 535, this is by example only and can equally be directed to any of the other embodiments having call-outs 645, 655, 665 as depicted in FIGS. 16A-18B.

The mining arrangement 635 further envisions the shielded environment 110 only existing when the skirt 630 is in an extended orientation (shown in FIG. 15C), which is defined by the skirt rim 632 resting atop the granular soil 112. The shielded environment 110 does not exist when the skirt rim 632 is in a retracted orientation (shown in FIG. 15B) defined by the skirt rim 632 spaced away from the granular soil 112. This embodiment further contemplates the skirt 630 being configured to be moved mechanically between the extended orientation and the retracted orientation, such as by the linkage 636.

Certain embodiments of the mining arrangement 635 is further envisioned to have the skirt 640 comprising two side rails 643, a front hinged flap 646A and a back hinged flap 646B, wherein the two side rails 643 are configured to slide on top of the granular soil 112 via corresponding side rail edges 642, like a sled sliding over the ground/snow. This arrangement 635 can further include the front hinged flap 646A cooperating with a front flap hinge 644A in a front pivoting relationship and the back hinged flap 646B cooperating with a back flap hinge 644B in a back pivoting relationship. Also, the two side rails 634 can comprise a rail leading edge ramp 641 that tapers towards a rail leading edge, like a sled rail.

In another embodiment of the mining arrangement 635, the skirt 650 can be compliant and the skirt rim 652 can be configured to conform to a granular soil surface of the granular soil 112. The skirt 650 can comprise a plurality of hinged plates 656 wherein each of the plates 656 is configured to rotate, such as in FIGS. 17A and 17B. In this configuration, the skirt 650 can further comprise a front hinged flap 646A at a front end 554 of the skirt 650 and a back hinged flap 646B at a back end 556 of the skirt 650, wherein the plurality of hinged plates 656 are on either side of the skirt 650 between the front end 554 and the back end 556. Instead of the hinged flaps 646A and 646B, a brush or some other kind of shield can be used to create the interior environment 110. Optionally, the entire skirt 660 can comprise a plurality of brush bristles 666, wherein each of the bristles 666 are contact with an adjacent bristle 666. The brush can also be a thick grouping of thin bristles 666.

Another embodiment of the present invention contemplates a variation of an environmental shield arrangement 635 comprising a cover 534 with a skirt 630, wherein the cover 534 terminates at a cover rim 535. The cover rim 535 defines a cover rim periphery. The skirt 630 extends from the cover rim 535 along the cover rim periphery to a skirt rim 632. The cover 534 and the skirt 630 define a shielded environment 110 when the skirt rim 632 is on (atop) regolith 112. The shielded environment 110 is essentially not in communication with an outside environment 462 via the cover 534 and skirt 630. While in use, the shielded environment 110 is never at a pressure above 10 millibars since regolith 112 is extra-terrestrial and inherently is under a low pressure below 10 millibars.

This embodiment further envisions the skirt 630 being configured to be moved mechanically between an extended orientation and a retracted orientation (as shown in FIGS. 15A-15C), the extended orientation is defined by the skirt rim 632 in contact with the regolith 112, the retracted orientation is defined by the skirt rim 632 spaced away from the regolith 112.

This embodiment optionally envisions the skirt 640 comprising two side rails 643, a flexible front flap 646A and a flexible back flap 646B, the two side rails 643 are configured to slide on top of the granular soil 112 via corresponding side rail edges 642. The flexible flaps 646A and 646B can be brushes, cloth, plates and hinges, etc., so long as the flexible flaps 646A and 646B can move with the surface of the regolith 112 while maintaining the shielded environment 110.

The environmental shield arrangement 635 is further envisioned to have the skirt 650 compliant and the skirt rim 652 be configured to conform to a top surface of the regolith 112.

The environmental shield arrangement 635 is further envisioned wherein the skirt 650 comprises a plurality of hinged plates 656 that are each configured to rotate about a pivot point 654, such as that shown in FIGS. 17A and 17B.

The environmental shield arrangement 635 further imagines the skirt 650 optionally comprising a flexible front flap 646A at a front end 554 of the skirt 650 and a flexible back flap 646B at a back end 556 of the skirt 650, wherein the plurality of hinged plates 656 are on either side of the skirt 650 between the front end 554 and the back end 556 (i.e., simply on the sides).

The embodiment can optionally have the skirt 660 being defined by a plurality of brush bristles 666 wherein each of the bristles 666 are contact with an adjacent bristle 666 forming a thick brush barrier of many bristles 666 that could be between 0.2 inches and 0.7 inches thick, for example.

In certain embodiments of the environmental shield arrangement 635, the cover rim periphery is essentially rectangular.

In yet an optional embodiment of the present invention, an environmental shield arrangement 635 is contemplated comprising a cover 534 that when disposed on a regolith surface 112 defines an interior environment 110 containing helium. The cover 534 is defined, in part, by a cover body 538 that extends from a cover apex 539 to a cover rim 535, wherein the cover rim 535 defines a cover rim periphery. A skirt 630 extends from the cover rim 535 along the periphery to a skirt rim 632. The interior environment 110 is defined within the cover 534 and the skirt 630 when the skirt rim 632 is disposed on regolith 112. The shielded environment is maintained at a pressure of below 10 millibars and contains helium gas. This embodiment is further envisioned wherein the cover rim periphery is essentially rectangular.

Certain other embodiments of the present invention contemplate a mining arrangement 562 comprising: a shielded environment 110 defined within a cover 534 that rests atop granular soil, which in one embodiment is regolith 112. The cover 534 comprises a cover body 538 that extends from a rim 535 to a cover top 539. The shielded environment 110 is not in communication with an outside environment 462 via the cover body 538. The mining arrangement 562 further comprises a blade 550, a heat source 160 and a gas collection surface 105. The blade extends from the rim 106 and is configured to penetrate the granular soil 112. The heat source 160, which is disposed in the cover 534 is configured to heat the granular soil 112. The gas collection surface 105 is disposed in the shielded environment 110 and is configured to maintain a temperature below 100° Kelvin.

The mining arrangement 562 is further envisioned to include an embodiment wherein the shielded environment 110 is connected to a rover 520.

The mining arrangement 562 is further envisioned to have the heat source 160 include a first heating element 164A that is configured to heat the granular soil 112 in front of the blade 550 and the second heating element 164B that is configured to heat the granular soil 112 behind the blade 550.

The mining arrangement 562 is further imagined having the cover 534 defining a front 554 and a rear 556, wherein the blade 550 is configured to move in a forward direction 516 pointing towards the front 554.

It is further contemplated that the mining arrangement 562 has the heat source 160 being a laser 160 or radiant heater 164.

The mining arrangement 562 can envision the blade 550 being an angled bar 590 that is part of a box blade system 595, the box blade system 595 comprising two horizontal plates 596 with the with the angled bar 590 interposed there between, the angled bar 590 comprising a ramp face 594 that extends from a leading edge 592 that faces the front 554. This can further be where the heat source 164 includes a first heating element 164 configured to direct heat on the angled face 594 and a second heating element 160 configured to direct heat on behind the angled bar 590.

It is further contemplated that the mining arrangement 562 has the blade 550 being part of a beveled disc system 603 that includes a plurality of beveled discs 600 configured to intermix the granular soil 112. This can further be where the heat source 164 is a first heating element 164A configured to direct heat in front of the plurality of beveled discs 600 and a second heating element 160 or 164B configured to direct heat on behind the plurality beveled discs 600.

The mining arrangement 562 further envisions the blade 550 being a plow 570 that flips the granular soil 112 over a trailing edge 557 of the plow 570.

It is also contemplated that the blade 550 in the mining arrangement 562 is part of a front blade row and wherein the mining arrangement 562 also has a second blade 552 that is part of a second blade row that is arranged to penetrate the granular soil 112 deeper than the first blade row (see FIG. 10C). This can further be wherein at least one heating element 160 of the heating source 160 is between the first blade row and the second blade row. An addition embodiment envisions that the blade 550 is heated.

Certain embodiments envision the shielded environment 110 of the mining arrangement 562 being at a pressure of less than $1 \times 10^{-5}$ bar, which consistent with the pressure on the Moon. Yet other embodiments envision the pressure under 10 millibars, which is the pressure on Mars.

Another embodiment of the present invention envisions a mining configuration 562 that comprises internal (shielded) environment 110 configured to be maintained at a pressure of less than $1 \times 10^{-5}$ bar. The internal environment 110 is defined within a cover 534 that rests atop granular soil 112, wherein the internal environment 110 is confined within the borders of the granular soil 112 and interior surface 107 of the cover 534. The cover 534 comprises a cover body 538 that extends from a rim 535 to a top cover apex 539. The internal environment 110 is not in communication with an outside environment 462 via the cover body 538. The mining arrangement 562 further comprises a blade 550, a heat source 160 and a gas collector 105. The blade 550 extends from the rim 535, wherein the blade 550 is partially in the granular soil 112. The heat source 160 is disposed in the cover 534, wherein the heat source 160 is configured to heat the granular soil 112. The gas collector 105 is in the shielded environment 110 and is configured to collect gas 115 that is freed from the granular soil 112 via heat from the heat source 160.

It is further contemplated that the shielded environment 110 in the mining configuration 562 is at a pressure of less than $1 \times 10^{-5}$ bar, while optional embodiments contemplate a pressure of less than $1 \times 10^{-2}$ bar, which is consistent with pressure on Mars.

The mining configuration 562 further envisions the shielded environment 110 being connected to a rover 520 and the granular soil 112 is regolith. It is further envisioned that the blade 550 is a plow 570 that disturbs the granular soil 112, meaning the blade 550 can turn over the granular soil 112, push aside the granular soil 112, plow through the granular soil 112, or simply loosen up the granular soil 112.

It is further contemplated that the heat source 160 of the mining configuration 562 is a laser 160 or radiant heater 164.

Yet another embodiment of the present invention envisions a mining system 562 method that comprises providing a shielded environment 110 that is defined within a cover 534. The cover 534 comprising a cover body 538 that extends from a rim 535 to a cover top 539. This is stipulated that the shielded environment 110 is not in communication with an outside environment 462 via the cover body 538. The method further envisions a step for resting the cover 534 atop regolith 112, penetrating the regolith 112 with a blade 550 extending from the rim 106, heating the regolith 112 with a heat source 160 that is disposed in the cover 534, and maintaining a gas collection surface 105 at a temperature below 100° Kelvin. The gas collection surface 105 is in the shielded environment 110.

Still, yet another embodiment of the present invention contemplates a vapor collection system 100 (as shown in FIG. 6A) that has a shielded environment 110 that is in a pressure at or less than $1 \times 10^{-5}$ bar. The shielded environment comprises sidewalls 460 extending from a rim 106/452 to a top edge 453, wherein the shielded environment 110 is defined inside of the sidewalls 460. A condensation surface 105 is disposed in the internal volume 110, wherein the condensation surface 105 maintained at a temperature below 100° Kelvin. A collection receptacle 140 that comprises an orifice 142 interfaces the condensation surface 105. A heating element 160 is in the shielded environment 110, wherein the heating element 160 is configured to direct heat to a heat region 116 at or beyond the rim 106. The heating element 160 can be a laser 160 as shown in FIG. 3B or a lattice of heated spikes 510 as shown in FIG. 8, for example, though other heating elements such as a rake or sifter that can waterfall regolith 112 across a heater are envisioned without departing from the scope and spirit of the present invention.

In another embodiment of the vapor collection system 100, the condensation surface 105 is imagined comprising at least one blade 108 that is configured to move inside of the shielded environment 110, such as a rotary blade as shown in FIG. 1A. Certain embodiments envision an electric motor 130 rotating the at least one blade 108, though in some embodiments gears on a carrier vehicle, such as a rover 520, as shown in FIG. 9, may drive the rotating blades 108, such as from the wheels.

Optionally, the vapor collection system embodiment 100 is envisioned wherein the condensation surface 105 is a fixed bar 408 that terminates 409 at a downward slope 136 with the receptacle 140 located where the fixed bar 408 terminates 409, as depicted in FIGS. 5A-6B.

The vapor collection system embodiment 100 further contemplates the heat region 116 being above 600° C. (873° Kelvin) when heated by the heating element 160, which is a temperature at which target gaseous materials 115 trapped in the regolith 112 are vaporized and released from the regolith 112.

The vapor collection system embodiment 100 further contemplated to have the condensation surface 105 being electrically cooled using a thermoelectric cooler or optionally cooled using a laser system. These could be supported or substituted by a cryogenically cooled condensation surface 105 using cryogenic fluid.

In certain embodiments the vapor collection system embodiment 100 is envisioned having a top surface 414 coving the top edge 453 to form a cover 104/404.

In another optional embodiment of the vapor collection system 100, the condensation surface 105 can comprise a plurality of fixed bars 408 that terminates 409 at a downward slope 136 with the receptacle 140 located where the fixed bars 408 terminate 409, the fixed bars block at least 70% of an upper surface area 454 defined by the top edge 453. An example of this embodiment is shown in FIGS. 5A and 6A.

In another embodiment of the present invention, a vapor collector 100 can comprise a shielded environment 110 defined by a cover 104, wherein the shielded environment 110 is configured to operate at a pressure of less than $1 \times 10^{-5}$ bar. The vapor collector 100 further comprises a condensation surface 105, which is disposed in the shielded environment 110. The condensation surface 105 is maintained in operation at a temperature between 2° Kelvin and 100° Kelvin, which can be, for example, at a dark portion on the lunar surface. There can further be a collection receptacle 140 comprising an orifice 142 that interfaces the condensation surface 105. The vapor collector 100 is envisioned to further comprise a heating element 160 that is located in the shielded environment 110. The heating element 160 is configured to direct heat to a heat region 116 at or beyond the rim 106.

Some embodiments of the vapor collector 100 envision the condensation surface 105 being defined by a plate that includes at least one cryogenic heat exchange tube 172 interposed between a top surface 484 and a bottom surface 486, the condensation surface 105 comprises the top surface 484 and the bottom surface 486, such as that shown in FIGS. 7A and 7B, for example. This arrangement can leverage the use of a cryogenic fluid reservoir 422 and a pump 424 that is configured to circulate the cryogenic fluid through the at least one cryogenic heat exchange tube 172. Additionally, a compressor and heat exchanger 430 can be employed to maintain the cryogenic fluid by thermodynamically cooling or otherwise exchanging heat from the cryogenic fluid.

Some embodiments of the vapor collector 100 envision the condensation surface 105 comprising a plurality of blades 108 that are configured to spin inside of the shielded environment 110. In some instances, each of the blades 108 has a distal end 109 that is connected to a collection tube 140 that is configured to collect target material 150 that is condensed from vapor 115 on the blades 108 by way of centripetal force from the blades 108 when spinning.

In some embodiments, the vapor collector 100 has the shielded environment 110 maintained at a temperature below 150° Kelvin due to the nature of residing in a dark/night location of the Moon.

Still other embodiments of the present invention contemplate a gas collecting arrangement 100 comprising a shielded environment 110 that when in operation is at a pressure of less than $1 \times 10^{-5}$ bar. The gas collecting arrangement 100 can comprise a condensation surface 105 in the internal volume 110, wherein there can be a means for maintaining the condensation surface 105 at a temperature between 2° Kelvin and 100° Kelvin. Such a means is shown in FIGS. 7A-7B but can further include electric and or laser cooling or some combination thereof. The gas collecting arrangement 100 can also comprise a collection receptacle 140 that interfaces the condensation surface 105. The condensation receptacle 140 can be configured to retain liquified gas 150 that condenses on the condensation surface 105 when somewhere in the temperature range between 2° Kelvin and 100° Kelvin. A heating element 160 is envisioned to be located in the shielded environment 110, wherein the heating element 160 is configured to heat a target region 116 at or beyond the rim 106.

The gas collecting arrangement 100 further envisions the condensation surface 105 comprising a plurality of blades 108 that are configured to spin inside of the shielded environment 110 as shown in FIG. 1A. As further shown in FIG. 1A, each of the blades 108 can be equipped with a collection tube 140 at each blade distal end 109. The collection tube 140 is configured to collect target material 150, floating around the shielded environment 110, that is condensed from vapor 115 on the blades 108 by way of centripetal force from the blades 108 when spinning.

These exemplified embodiments are not exhaustive of the embodiments presented throughout the description, but rather are merely one example of a contemplated embodiment chain consistent with embodiments of the present invention. In other words, there are numerous other embodiments described herein that are not necessarily presented in the apparatus embodiment examples presented immediately above.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the condensation surface 105 can include other geometries not explicitly shown in the embodiments above while maintaining essentially the same functionality without departing from the scope and spirit of the present invention. Likewise, the condensation surface 105 is depicted as being cooled by tubes running through a plate, but cryogenic conduits can just as easily run over or under the plate, be partially embedded in the plate, be a hollow plate with a large pocket therein, or something in between without departing from the scope and spirit of the present invention.

All parts can be manufactured by printing techniques, molding techniques, machining or something that incorporates several techniques known to those skilled in the art of manufacturing. Additionally, though FIGS. 1A-1E depict a pump that is away from the blades requiring a slip ring arrangement, other embodiments contemplate a pump being on the blade to avoid any kind of static to spinning junction. It should also be recognized that the skirt rim could have multiple different components and be over or under the cover, or even be integrated or partially integrated as a single element with the cover without departing from the scope and spirit of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A mining arrangement comprising:
  a cover comprising a rigid cover body extending in a first direction from a cover rim to a cover apex;
  a skirt extending in a second direction from the cover rim to a skirt rim, the second direction is opposite the first direction;
  the cover and the skirt define a shielded environment when the skirt rim rests atop granular soil;
  the shielded environment is essentially not in communication with an outside environment via the cover body and the skirt;
  a gas collection surface in the shielded environment, the gas collection surface configured to maintain a temperature below 100° Kelvin; and
  a liquid collection receptacle configured to collect cryogenic liquid from the gas collection surface, the liquid collection receptacle within the shielded environment.

2. The mining arrangement of claim 1, wherein the shielded environment only exists when the skirt is in an extended orientation relative to the rigid cover body defined by the skirt rim resting atop the granular soil, the shielded environment does not exist when the skirt rim is in a retracted orientation defined by the skirt rim spaced away from the granular soil.

3. The mining arrangement of claim 2, wherein the skirt is configured to be moved mechanically between the extended orientation and the retracted orientation.

4. The mining arrangement of claim 1, wherein the skirt comprises two side rails, a front hinged flap and a back hinged flap, the two side rails are configured to slide on top of the granular soil via corresponding side rail edges.

5. The mining arrangement of claim 4, wherein the front hinged flap cooperates with a front flap hinge in a front pivoting relationship and the back hinged flap cooperates with a back flap hinge in a back pivoting relationship.

6. The mining arrangement of claim 4, wherein each of the two side rails comprise a rail leading edge ramp that tapers towards a rail leading edge.

7. The mining arrangement of claim 1, wherein the skirt is compliant, and the skirt rim is configured to conform to a granular soil surface of the granular soil.

8. The mining arrangement of claim 7, wherein the skirt comprises a plurality of hinged plates wherein each of the plates is configured to rotate.

9. The mining arrangement of claim 8, wherein the skirt further comprises a front hinged flap at a front end of the skirt and a back hinged flap at a back end of the skirt, the plurality of hinged plates is on either side of the skirt between the front end and the back end.

10. The mining arrangement of claim 7, wherein the skirt comprises a plurality of brush bristles wherein each of the bristles are contacted with an adjacent bristle.

11. An environmental shield arrangement comprising:
  a cover that terminates at a cover rim, the cover rim defining a cover rim periphery;
  a skirt extending from the cover rim along the cover rim periphery to a skirt rim;
  the cover and the skirt define a shielded environment when the skirt rim is on regolith;
  the shielded environment is essentially not in communication with an outside environment via the cover and the skirt;
  a gas collection surface in the shielded environment configured to liquefy the gas;
  a liquified gas receptacle in the shielded environment connected to the gas collection surface, the liquified gas receptacle configured to retain the liquified gas;
  the shielded environment is never at a pressure above 10 millibars.

12. The environmental shield arrangement of claim 11, wherein the skirt is configured to be moved mechanically between an extended orientation and a retracted orientation relative to the rigid cover body, the extended orientation is defined by the skirt rim in contact with the regolith, the retracted orientation is defined by the skirt rim spaced away from the regolith.

13. The environmental shield arrangement of claim 11, wherein the skirt comprises two side rails, a flexible front flap and a flexible back flap, the two side rails are configured to slide on top of the granular soil via corresponding side rail edges.

14. The environmental shield arrangement of claim 11, wherein the skirt is compliant and the skirt rim is configured to conform to a top surface of the regolith.

15. The environmental shield arrangement of claim 11, wherein the skirt comprises a plurality of hinged plates that are each configured to rotate about a pivot point.

16. The environmental shield arrangement of claim 15, wherein the skirt further comprises a flexible front flap at a front end of the skirt and a flexible back flap at a back end of the skirt, the plurality of hinged plates are on either side of the skirt between the front end and the back end.

17. The environmental shield arrangement of claim 11, wherein the skirt comprises a plurality of brush bristles wherein each of the bristles are contacted with an adjacent bristle.

18. The environmental shield arrangement of claim 11, wherein the cover rim periphery is essentially rectangular.

19. An environmental shield arrangement comprising:
  a cover comprising a cover body that extends from a cover apex to a cover rim, the cover rim defining a cover rim periphery;
  a skirt extending from the cover rim along the periphery to a skirt rim,
  a shielded environment defined within the cover and the skirt when the skirt rim is disposed on regolith;
  a gas liquification surface in the shielded environment configured to liquefy gas from the regolith;
  at least one liquified gas receptacle in the shielded environment connected to the gas liquification surface, the least one liquified gas receptacle configured to retain the liquified gas, the shielded environment is maintained at a pressure of below 10 millibars.

20. The environmental shield arrangement of claim 19, wherein the cover rim periphery is essentially rectangular.

* * * * *